(12) United States Patent
Wang et al.

(10) Patent No.: US 11,537,841 B2
(45) Date of Patent: Dec. 27, 2022

(54) SYSTEM AND METHOD FOR COMPACT NEURAL NETWORK MODELING OF TRANSISTORS

(71) Applicant: Samsung Electronics Co., Ltd., Suwon-si (KR)

(72) Inventors: Jing Wang, San Jose, CA (US); Woosung Choi, Milpitas, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 858 days.

(21) Appl. No.: 16/430,219

(22) Filed: Jun. 3, 2019

(65) Prior Publication Data
US 2020/0320366 A1 Oct. 8, 2020

Related U.S. Application Data

(60) Provisional application No. 62/831,038, filed on Apr. 8, 2019.

(51) Int. Cl.
*G06N 3/04* (2006.01)
*G06F 119/12* (2020.01)
(Continued)

(52) U.S. Cl.
CPC .............. *G06N 3/04* (2013.01); *G06F 30/33* (2020.01); *G06N 3/08* (2013.01); *G06F 2119/12* (2020.01)

(58) Field of Classification Search
USPC ......................................................... 706/16
See application file for complete search history.

(56) References Cited

U.S. PATENT DOCUMENTS 6,438,729 B1   8/2002   Ho
6,721,922 B1   4/2004   Walters et al.
(Continued)

FOREIGN PATENT DOCUMENTS

WO       2014144337 A1       9/2014

OTHER PUBLICATIONS

Hanene Ben Hammouda, et al., "Neural-Based Models of Semi-conductor Devices for SPICE Simulator", Microelectronic and Instrumentation Laboratory (µEI), Monastir University, Tunisia, American Journal of Applied Sciences 5 (4): pp. 385-391, 2008, Science Publications.

(Continued)

*Primary Examiner* — Bryce M Aisaka
(74) *Attorney, Agent, or Firm* — Lewis Roca Rothgerber Christie LLP

(57) ABSTRACT

A method for generating a model of a transistor includes: initializing hyper-parameters; training the neural network in accordance with the hyper-parameters and training data relating transistor input state values to transistor output state values to compute neural network parameters; determining whether the transistor output state values of the training data match an output of the neural network; porting the neural network to a circuit simulation code to generate a ported neural network; simulating a test circuit using the ported neural network to simulate behavior of a transistor of the test circuit to generate simulation output; determining whether a turnaround time of the generation of the simulation output is satisfactory; in response to determining that the turnaround time is unsatisfactory, re-training the neural network based on updated hyper-parameters; and in response to determining that the turnaround time is satisfactory, outputting the ported neural network as the model of the transistor.

24 Claims, 16 Drawing Sheets

(51) Int. Cl.
*G06N 3/08* (2006.01)
*G06F 30/33* (2020.01)

(56) References Cited

U.S. PATENT DOCUMENTS

| | | |
|---|---|---|
| 7,617,470 B1 | 11/2009 | Dehon et al. |
| 8,468,482 B1 | 6/2013 | Pack et al. |
| 8,606,557 B2 | 12/2013 | Joshi et al. |
| 8,615,725 B1 | 12/2013 | Keller et al. |
| 8,645,883 B2 | 2/2014 | Korobkov et al. |
| 8,863,052 B1 | 10/2014 | Dhuria et al. |
| 8,869,081 B2 | 10/2014 | Saleh et al. |
| 8,924,901 B2 | 12/2014 | Mang et al. |
| 9,009,638 B1 | 4/2015 | Hook et al. |
| 2002/0055193 A1 | 5/2002 | Tsai |
| 2003/0188267 A1 | 10/2003 | Lehner et al. |
| 2005/0113951 A1 | 5/2005 | Akiyama et al. |
| 2008/0133202 A1 | 6/2008 | Tseng et al. |
| 2012/0290281 A1 | 11/2012 | Joshi et al. |
| 2014/0200166 A1 | 7/2014 | Van Rooyen et al. |
| 2016/0078361 A1* | 3/2016 | Brueckner ............ H04L 67/10 706/12 |

OTHER PUBLICATIONS

Xiaolin Xu, et al., "Reliable Physical Unclonable Functions Using Data Retention Voltage of SRAM Cells", IEEE Transactions on Computer-Aided Design of Intergrated Circuits and Systems, Jun. 2015, pp. 903-914, vol. 34, No. 6.

Navneet Kaur, et al., "Performance Optimization of Broadwell-Y Shaped Transistor using Artificial Neural Network and Moth-Flame Optimization Technique", Majlesi Journal of Electrical Engineering, Mar. 2018, pp. 61-69, vol. 12, No. 1.

Kaige Jia, et al., "Calibrating Process Variation at System Level with In-Situ Low-Precision Transfer Learning for Analog Neural Network Processors", Beijing National Research Center for Information Science and Technology, Association for Computing Machinery, DAC' 18, Jun. 24-29, 2018, 6 pgs., San Fransisco, CA.

* cited by examiner

SYSTEM AND METHOD FOR COMPACT NEURAL NETWORK MODELING OF TRANSISTORS

CROSS-REFERENCE TO RELATED APPLICATION(S)

This application claims priority to and the benefit of U.S. Provisional Patent Application No. 62/831,038, filed in the United States Patent and Trademark Office on Apr. 8, 2019, the entire disclosure of which is incorporated by reference herein.

This application is related to U.S. Pat. No. 10,204,188, issued on Feb. 12, 2019, the entire disclosure of which is incorporated by reference herein.

FIELD

Aspects of embodiments of the present invention relate to the field of semiconductor devices, including systems, methods, and computer programs for designing semiconductor devices and circuits, including modeling the transistors of a circuit.

BACKGROUND

Simulating the operation of electrical circuits generally includes the use of models of the behavior of the elements or components of the circuit, such as current-voltage (I-V) characteristics with respect to various terminals of a transistor. Circuit simulation is a computationally intensive task involving, for example, hours of actual time for fractions of a second of simulated circuit time, where the models of the individual circuit elements are frequently invoked in the inner loops of the circuit simulator. Accordingly, the speed of execution of the models of circuit elements has a significant impact on the turnaround time for running a circuit simulation.

SUMMARY

Aspects of embodiments of the present invention relate to compact, neural network based models of transistors, suitable for incorporation into a simulation of an electrical circuit. Some aspects of embodiments of the present invention relate to models of transistors that model performance differences due to process variations.

According to one embodiment of the present invention, a method for generating a model of a transistor includes: initializing, by a computing system, a plurality of hyper-parameters configuring a structure of a neural network; training, by the computing system, the neural network in accordance with the hyper-parameters and a plurality of training data relating transistor input state values to transistor output state values to compute a plurality of neural network parameters; determining, by the computing system, whether the transistor output state values of the training data match an output of the neural network; in response to determining that the transistor output state values do not match the output of the neural network, updating, by the computing system, the hyper-parameters and re-training the neural network based on the updated hyper-parameters; in response to determining that the transistor output state values of the training data match the output of the neural network, porting, by the computing system, the neural network to a circuit simulation code to generate a ported neural network; simulating a test circuit using the ported neural network to simulate behavior of a transistor of the test circuit to generate simulation output; determining, by the computing system, whether a turnaround time of the generation of the simulation output is satisfactory; in response to determining that the turnaround time is unsatisfactory, updating, by the computing system, the hyper-parameters and re-training the neural network based on the updated hyper-parameters; and in response to determining that the turnaround time is satisfactory, outputting the ported neural network as the model of the transistor.

The method may further include simulating a circuit including the transistor, the simulating the circuit including simulating the output of the transistor using the ported neural network.

The neural network may include: an input layer configured to receive the transistor input state values; a plurality of hidden layers which may include: a first hidden layer configured to receive activations from the input layer; and a last hidden layer; an output layer configured to compute output features from a plurality of activations received from the last hidden layer; and a plurality of conversion functions configured to convert the output features to the output of the neural network, and the neural network parameters may include weights and biases mapping between adjacent layers of the neural network in accordance with an affine transformation.

The hyper-parameters may include: a number of hidden layers; for each of the hidden layers, a number of neurons in the hidden layer; and an activation function.

The determining whether the transistor output state values of the training data match the output of the neural network may include: determining whether the output of the neural network is within a first threshold of corresponding values of the transistor output state values; and determining whether a first derivative of the output of the neural network is within a second threshold of corresponding values of a first derivative of the transistor output state values.

In response to determining that the output of the neural network is not within the first threshold of corresponding values of the transistor output state values, the hyper-parameters may be updated to increase the number of hidden layers or to increase the number of neurons.

In response to determining that the first derivative of the output of the neural network is not within the second threshold of corresponding values of the first derivative of the transistor output state values, the hyper-parameters may be updated to decrease the number of hidden layers or to decrease the number of neurons.

In response to determining that the turnaround time is unsatisfactory, the hyper-parameters may be updated to decrease the number of hidden layers or to decrease the number of neurons.

The method may further include re-targeting the neural network in accordance with a plurality of electronic targets, the re-targeting including: updating a plurality of output weights and output biases of the neural network parameters mapping from the last hidden layer to the output layer to fit the output of the neural network to the plurality of electronic targets, wherein the last hidden layer has fewer neurons than the number of the electronic targets.

The model may capture process variations, and the training data may include data relating the transistor input state values to the transistor output state values in accordance with a plurality of process variation corners corresponding to a plurality of process variation sources.

The method may further include: training a plurality of process variation neural networks, each of the process variation neural networks being trained based on training data of a corresponding process variation corner, wherein the ported neural network may include the plurality of process variation neural networks.

The transistor input state values may further include the plurality of process variation sources, and the training the neural network may include training based on the training data relating the transistor input state values to the transistor output state values in accordance with the plurality of process variation corners.

According to one embodiment of the present invention, a system for generating a model of a transistor includes: a processor; and memory storing instructions that, when executed by the processor, cause the processor to: initialize a plurality of hyper-parameters configuring a structure of a neural network; train the neural network in accordance with the hyper-parameters and a plurality of training data relating transistor input state values to transistor output state values to compute a plurality of neural network parameters; determine whether the transistor output state values of the training data match an output of the neural network; in response to determining that the transistor output state values do not match the output of the neural network, update the hyper-parameters and re-train the neural network based on the updated hyper-parameters; in response to determining that the transistor output state values of the training data match the output of the neural network, port the neural network to a circuit simulation code to generate a ported neural network; simulate a test circuit using the ported neural network to simulate behavior of a transistor of the test circuit to generate simulation output; determine whether a turnaround time of the generation of the simulation output is satisfactory; in response to determining that the turnaround time is unsatisfactory, update the hyper-parameters and re-train the neural network based on the updated hyper-parameters; and in response to determining that the turnaround time is satisfactory, output the ported neural network as the model of the transistor.

The memory may further store instructions that, when executed by the processor, cause the processor to simulate a circuit including the transistor by simulating the output of the transistor using the ported neural network.

The neural network may include: an input layer configured to receive the transistor input state values; a plurality of hidden layers which may include: a first hidden layer configured to receive activations from the input layer; and a last hidden layer; an output layer configured to compute output features from a plurality of activations received from the last hidden layer; and a plurality of conversion functions configured to convert the output features to the output of the neural network, and wherein the neural network parameters may include weights and biases mapping between adjacent layers of the neural network in accordance with an affine transformation.

The hyper-parameters may include: a number of hidden layers; for each of the hidden layers, a number of neurons in the hidden layer; and an activation function.

The instructions to determine whether the transistor output state values of the training data match the output of the neural network may include instructions for: determining whether the output of the neural network is within a first threshold of corresponding values of the transistor output state values; and determining whether a first derivative of the output of the neural network is within a second threshold of corresponding values of a first derivative of the transistor output state values.

The memory may further store instructions that, when executed by the processor, cause the processor to, in response to determining that the output of the neural network is not within the first threshold of corresponding values of the transistor output state values, update the hyper-parameters to increase the number of hidden layers or to increase the number of neurons.

The memory may further store instructions that, when executed by the processor, cause the processor to, in response to determining that the first derivative of the output of the neural network is not within the second threshold of corresponding values of the first derivative of the transistor output state values, update the hyper-parameters to decrease the number of hidden layers or to decrease the number of neurons.

The memory may further store instructions that, when executed by the processor, cause the processor to, in response to determining that the turnaround time is unsatisfactory, update the hyper-parameters to decrease the number of hidden layers or to decrease the number of neurons.

The memory may further store instructions that, when executed by the processor, cause the processor to re-target the neural network in accordance with a plurality of electronic targets, the re-targeting including: updating a plurality of output weights and output biases of the neural network parameters mapping from the last hidden layer to the output layer to fit the output of the neural network to the plurality of electronic targets, wherein the last hidden layer may have fewer neurons than the number of the electronic targets.

The model may captures process variations, and the training data may include data relating the transistor input state values to the transistor output state values in accordance with a plurality of process variation corners corresponding to a plurality of process variation sources.

The memory may further stores instructions that, when executed by the processor, cause the processor to: train a plurality of process variation neural networks, each of the process variation neural networks being trained based on training data of a corresponding process variation corner, wherein the ported neural network may include the plurality of process variation neural networks.

The transistor input state values may further include the plurality of process variation sources, and wherein the memory may further store instructions that, when executed by the processor, cause the processor to train the neural network based on the training data relating the transistor input state values to the transistor output state values in accordance with the plurality of process variation corners.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
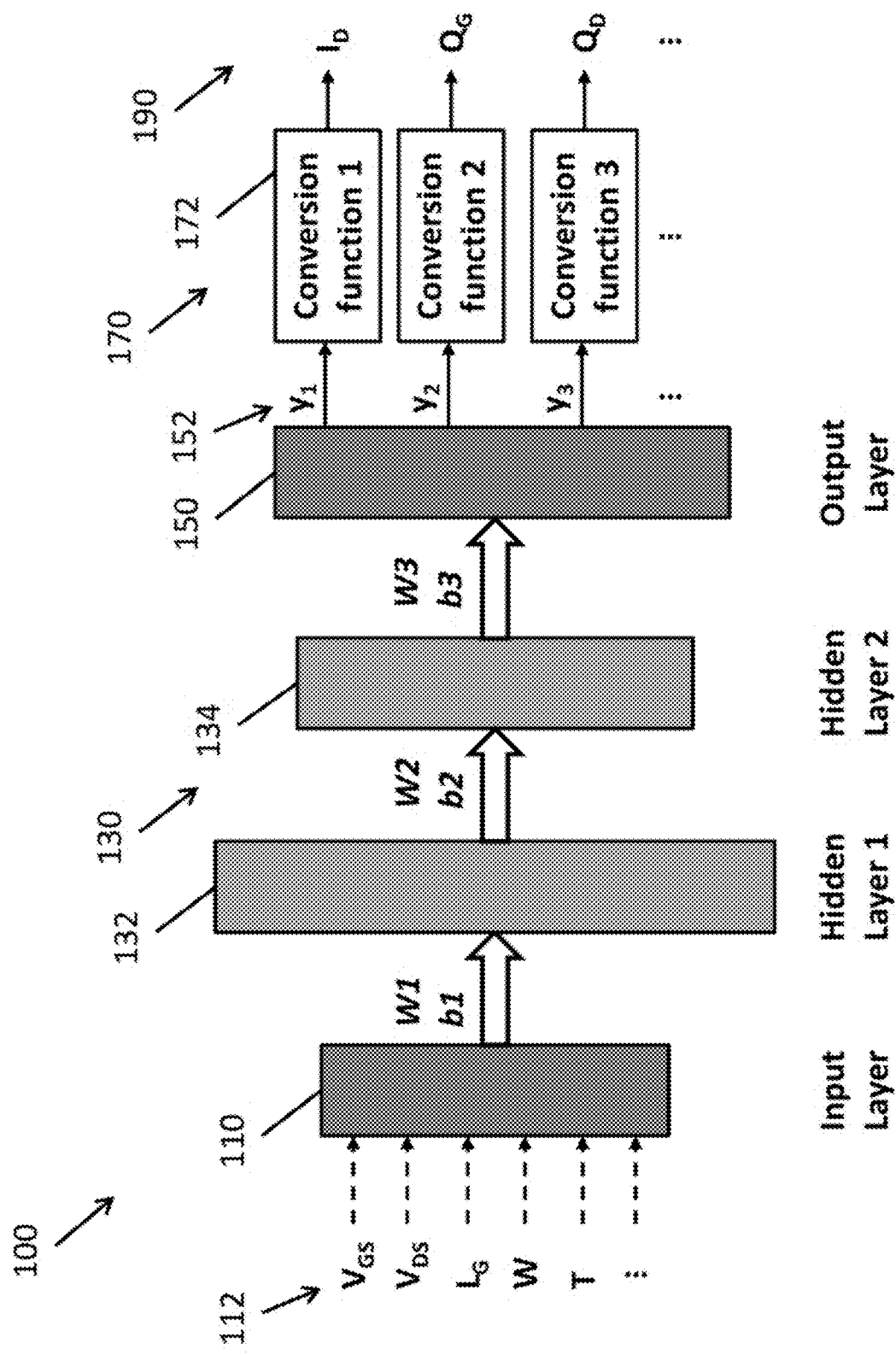
FIG. 1 is a schematic block diagram of a neural network according to one embodiment of the present invention to model the behavior of a transistor.

In the following detailed description, only certain exemplary embodiments of the present invention are shown and described, by way of illustration. As those skilled in the art would recognize, the invention may be embodied in many different forms and should not be construed as being limited to the embodiments set forth herein.

As noted above, circuit simulation is a computationally intensive task, typically involving hours or days of simulation time, where the speed of execution of models of individual circuit elements have a significant impact on the turnaround time (TAT) of running the circuit simulation. Faster circuit simulation also results in a better experience for human circuit designers and for computer-driven explorations of design choices, because the reduced TAT shortens a feedback loop simulating the performance of any given design. Therefore, there is a demand for accurate transistor compact models with a fast runtime for technology benchmarking and circuit design.

Comparative techniques for the modeling of circuit components typically use physically-derived equations. Such physics-based models (e.g., closed-form equations) are generally compact (e.g., have relatively low memory requirements and short execution times) and therefore exhibit good runtime performance in a simulation. However, developing the physics-based model equations requires high expertise (e.g., deep understanding of semiconductor physics) and an associated long turnaround time in terms of the development of these physics-based models, which limits the usage of these techniques for emerging devices (e.g., new transistor designs). In addition, the use of human expertise in the process of model parameter extraction makes it difficult to fully automate the process.

Some comparative techniques use a look-up-table (LUT) instead of explicit physics-based equations. However, LUT techniques typically exhibit high simulation TAT and convergence issues for large-scale circuits. For example, high simulation TAT may be large because the look-up tables may be too large to fit into the cache memory of a computer processor, let alone its registers, and loading the look-up tables from main memory for each circuit element at each step of the simulation can cause significant delays.

Some aspects of embodiments of the present invention relate to the use of Artificial Neural Network (ANN) based compact modeling methods. Some aspects of embodiments of the present invention relate to methods for the automated development of compact neural network models, methods for re-targeting developed models, and methods for capturing process variations in the models.

Accordingly, aspects of embodiments of the present invention enable faster model development and more efficient model parameter extraction (as compared with the physical equation based method) and better convergence and shorter turnaround time than comparative techniques, with the ability to perform model retargeting (as compared with the look-up-table based method).

Model Development

One aspect of embodiments of the present invention relates to an automated method for generating neural network (NN) based compact models with high accuracy, robustness and fast simulation turnaround time (TAT). In some embodiments of the present invention, the method includes initial data preparation and neural network setup, neural network training, model quality check, model porting (e.g., to a language for implementing circuit simulations such as the Verilog-A hardware description language (HDL) or Common Model Interface (CMI) for use with the Cadence® Spectre® Circuit Simulator), Simulation Program with Integrated Circuit Emphasis (SPICE) simulation validation and TAT verification.

FIG. 1 is a schematic block diagram of a neural network according to one embodiment of the present invention to model the behavior of a transistor. As shown in FIG. 1, the neural network 100 includes an input layer 110 configured to receive one or more input parameters 112, one or more hidden layers 130, an output layer 150, and one or more conversion functions 170 configured to compute outputs 190 from the output features 152 of the output layer 150. Generally, the neural network 100 takes input parameters corresponding to a state of the transistor (e.g., voltage biases applied to the terminals of the transistor) and generates outputs representing the behavior of the transistor in the current state (e.g., output currents and charges).

In some embodiments, the input parameters 112 include two types: voltage biases (e.g., for a 4-terminal field effect transistor, this includes a gate-source voltage $V_{GS}$, a drain-source voltage $V_{DS}$, and a body-source voltage $V_{BS}$) and device instance parameters (for a typical FET, this includes gate length $L_g$, FET width W, temperature T, and, in the case of a FinFET, the number of fins, etc.).

In the particular example neural network shown in FIG. 1, the input parameters 112 to the network include transistor input state values including a gate-source voltage $V_{GS}$, a drain-source voltage $V_{DS}$, a gate length $L_G$, a gate width W, and a temperature T, and the outputs include transistor output state values including drain current $I_D$, gate charge $Q_G$, and drain charge $Q_D$. In addition, the hidden layers 130 of the network 100 shown in FIG. 1 include two layers: a first hidden layer 132 and a second hidden layer 134.

According to one embodiment of the present invention, the values x from a layer are mapped to values of a next layer, in a fully connected manner, based on an affine transformation of the form Wx+b. For example, the input parameters to the input layer 110 are mapped to the first hidden layer 132 by first weights W1 and first biases b1. Similarly, the outputs of the first hidden layer 132 are mapped to inputs of the second hidden layer 134 by second weights W2 and second biases b2, and the outputs of the second hidden layer 134 are mapped to output layer 150 by third weights W3 and third biases b3. In some embodiments of the present invention, an activation function is placed between the output of the affine function Wx+b and the input of the next layer. Examples of activation functions include the rectified linear (ReLU) function, a sigmoid function, and the like. The particular choice of activation function used between layers may be set as a hyper-parameter of the network 100, as discussed in more detail below.

A neural network is generally more easily trained when the values propagated between the layers are normally distributed with means near zero. Accordingly, the output features 152 ($y_1$, $y_2$, $y_3$, . . . ) of the neural network corresponding to particular predicted characteristics of the modeled circuit element generally do not match up with the units of the physical parameters that they model. In addition, some of the particular output values may be computed based, in part, on particular input parameters 112. Therefore, the output features or feature vector 152 ($y_1$, $y_2$, $y_3$, . . . ) of the neural network 100 are converted by conversion functions 170 into physically meaningful values (e.g., drain current $I_D$, gate current $I_G$, source current $I_S$, drain charge $Q_D$, gate charge $Q_G$, source charge $Q_S$, and body charge $Q_B$) representing the behavior of the transistor. For example, a conversion function 172 for mapping from an output feature $y_1$ corresponding to the drain current $I_D$ to a predicted drain current in amperes may be:

$$I_D = \exp(y_1) \cdot V_{DS} \cdot 1\text{pA}$$

The particular structure of a neural network 100 may be specified through a number of hyper-parameters, including the number of hidden layers 130, the number of neurons in each of those hidden layers (each hidden layer may have a different number of neurons), the choice of activation function between the output of the affine computations and the input of the following layer. The particular choice of hyper-parameters suitable for a network may vary based on, for example, the complexity of the physical characteristics of the transistor being modeled. However, it is generally difficult to predict what set of hyper-parameters would yield the best results for a neural network.

As such, some aspects of embodiments of the present invention relate to a system and method for automatically selecting a set of hyper-parameters for a neural network for simulating a circuit element such as a transistor.

Figure 2:
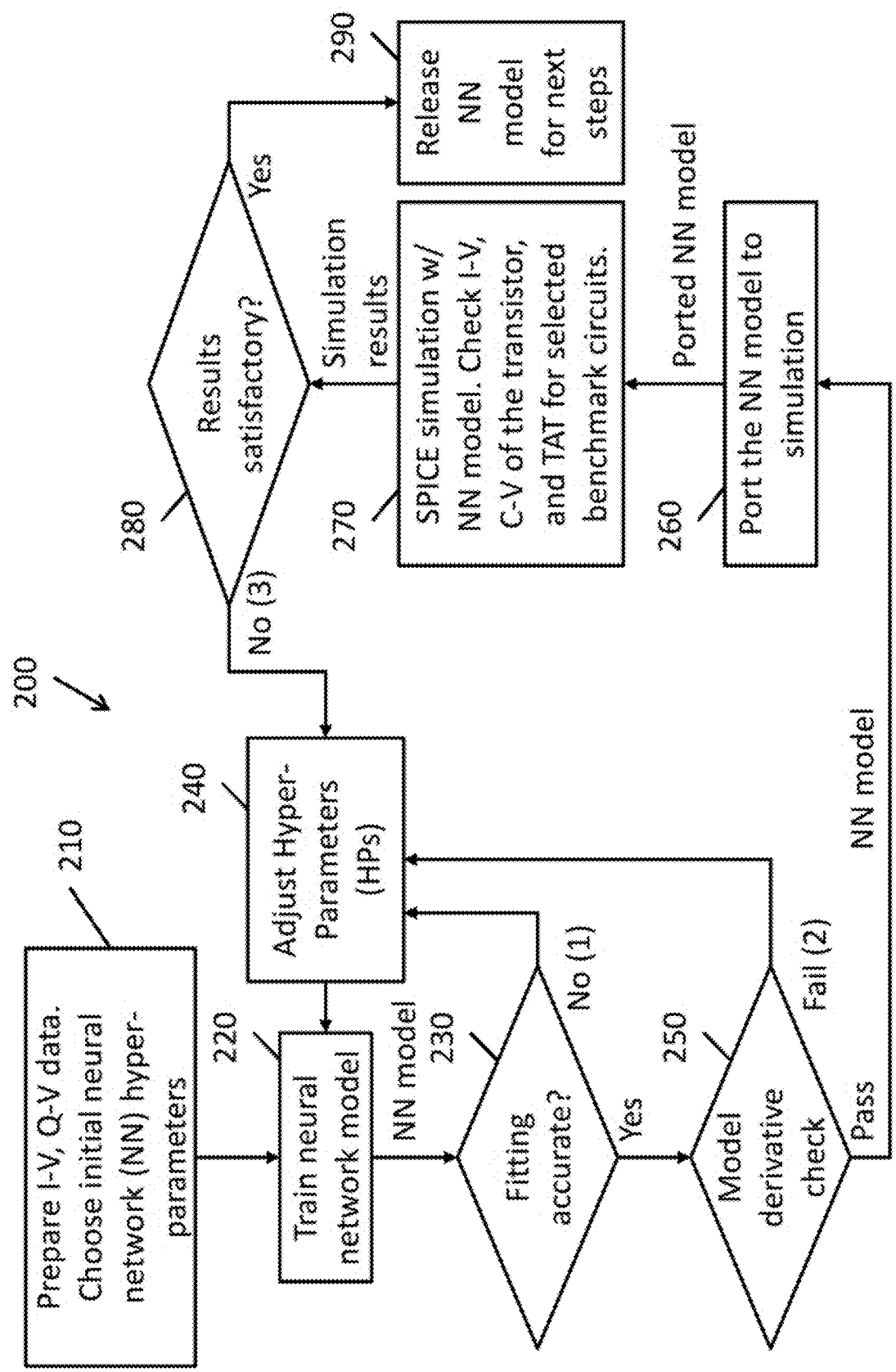
FIG. 2 is a flowchart of a method according to one embodiment of the present invention for training a neural network to model a transistor, including automatically selecting hyper-parameters for the neural network to achieve satisfactory model accuracy and simulation turn-around-time.

FIG. 2 is a flowchart of a method 200 according to one embodiment of the present invention for training a neural network to model a transistor, including automatically selecting hyper-parameters for the neural network. The various operations of the method shown in FIG. 2 may be performed by a computing system including at least one processor and a memory storing instructions that, when executed by the processor, cause the processor to perform the operations described. Embodiments of the present invention may be implemented in a variety of different computing systems, such as single computers and computing clusters. The computing system may include one or more processors such as central processing units (CPUs), graphics processing units (GPUs), and other vector processing units. The computing systems may also include multiple types of memory, including multiple levels of cache memory located on the same die as a processing core of a processor, dynamic random access memory (DRAM), and persistent mass storage devices (e.g., solid state flash drives and hard disk drives).

In operation 210, the computing system prepares current-voltage (I-V) and charge-voltage (Q-V) training data received regarding the transistor to be modeled. These training data may be generated from a transistor simulation tool such as the Synopsys® Technology Computer Aided Design (TCAD) tool or may be experimentally measured from one or more fabricated physical devices (e.g., preliminary data from early prototypes of devices). Preparation of the data may include cleaning the data and arranging the data into a format acceptable for a neural network training platform such as Google® TensorFlow® or PyTorch. The preparation of the data may also include separating the data into a training set, a validation set, and a test set. In addition, in operation 210, initial hyper-parameters for the neural network may be automatically set, e.g., based on a set of defaults or set to random values within particular ranges. (Prior experience from the neural network models of a similar device can be helpful on selecting the initial hyper-parameters.)

In operation 220, the computing system trains a neural network model of the transistor based on the supplied training data, where the neural network model has a structure configured based on the supplied hyper-parameters (e.g., number of hidden layers, number of neurons in each hidden layer, and the like). The training is performed automatically by the neural network training platform (such as Google® TensorFlow® or PyTorch), where a technique such as backpropagation is used to compute the weights W and biases b (e.g., W1, W2, and W2 and b1, b2, and b3 depicted in FIG. 1) of the neural network, such that the model maps the input parameters 112 to the outputs 190 in a manner consistent with the training set of the data.

In operation 230, the computing system determines whether the fit between the model and the supplied data is accurate. Typically, this evaluation is performed by using the training set of the validation set of the supplied data. In the event that the fit between the model and the training/validation sets is not accurate (e.g., below a threshold accuracy level), then the computing system adjusts the hyper-parameters in operation 240. In particular, under this condition (labeled "(1)" in FIG. 2), the computer system increases the number of hidden layers and/or increases the number of neurons in each hidden layer under the assumption that the previously trained model failed to fit the data because it did not have enough dimensions to model the complexity of the underlying physical dynamics of the transistor. The computing system then returns to operation 220 to train a new neural network based on the updated hyper-parameters.

If the fitting was found to be sufficiently accurate (e.g., exceed a threshold level), then, in operation 250, the computing system performs a model derivative check to determine if there was overfitting of the data. For example, in some embodiments the derivatives of the I-V curves and C-V curves generated by the model are compared against the derivatives of the corresponding curves in the experimental data. If the computing system finds that there is not a good match, then the computing system adjusts the hyper-parameters in operation 240. In particular, under this condition (labeled "(2)" in FIG. 2, the computer system decreases the number of hidden layers and/or the number of neurons in each hidden layer under the assumption that the previously trained model overfits the data and that the model complexity should be reduced (e.g., regularized) in order to improve performance.

In some embodiments, the fitting accuracy of operation 230 and the model derivative check of operation 250 are performed automatically based on functionality integrated into the model training platform. In some embodiments, the fitting error is calculated as the root-sum-squared of the relative errors of the model value with respect to the target value for each training sample. The fitting criterion is determined by the requirements of the application cases of the transistor model (e.g., in some embodiments, a criterion of <1% error is used for both I-V and Q-V fitting of a transistor.)

If the model derivative check was passed in operation 250, then in operation 260, the computing system ports the trained neural network model into circuit simulation code such as the Verilog-A hardware description language (HDL) or Common Model Interface (CMI) for use with the Cadence® Spectre® Circuit Simulator. In one embodiment of the present invention, the parameters of the trained neural network (the weights W and biases b for each layer) are copied into a source code file (e.g., Verilog-A file) as internal variables in a representation appropriate to the programming language of the simulator. A corresponding set of equations implementing the neural network are written in a source code file (e.g., a Verilog-A file) to perform the neural network calculations (e.g., matrix multiplication and activation functions such as sigmoid) in accordance with the stored parameters. (The parameters may be stored in the same file as the equations or in a different file from the equations.) The resulting model, implemented in the programming language of the simulator, takes the inputs such as voltage biases and device instance parameters from the circuit simulator, performs internal computation based on the neural network parameters, and outputs the terminal currents and charges of the device to the circuit simulator.

The size of the model, in terms of number of neural network parameters, is significantly smaller than the size of a lookup table (LUT). Accordingly, the ported neural network model is more compact than corresponding LUT based techniques for modeling a transistor. Furthermore, the more compact size of a neural network based model according to embodiments of the present invention allows the neural network based model to fit, for example, into a processor level cache of a processor and/or in one or more vector registers of a processor, thereby allowing faster computation of predicted transistor outputs based on the model, without traversing multiple levels of the memory hierarchy of a computer system.

In operation 270, the computing system runs a simulation (e.g., a SPICE simulation) of a circuit, where the simulation uses the ported neural network model to simulate the behavior of at least one element of the circuit. For example, in the case where there are multiple circuit elements of the same type (e.g., multiple transistors of the same type), the simulator may simulate the behavior of each of the circuit elements (e.g., transistors) using the same neural network model. In addition, the simulation may include other neural network models simulating the behavior of other circuit elements (e.g., transistors of different types). Running the simulation of the electrical circuit may include supplying simulated input voltage and/or current waveforms to one part of the circuit and computing simulation results, which include voltages and/or currents in other parts of the circuit.

In operation 280, the computing system determines whether the results are satisfactory (e.g., if the simulation TAT of the benchmark circuits is below a criterion provided by the model users.). If not, then the computing system returns to operation 240 to adjust the hyper-parameters. In particular, under this condition (labeled "(3)" in FIG. 2, the computer system decreases the number of hidden layers and/or the number of neurons in each hidden layer under the assumption that the complexity of the previously trained model should be reduced (e.g., regularized) in order to improve simulation TAT. If the results are satisfactory, then the trained model may then be released (e.g., output) for deployment or for further processing according to other aspects of embodiments of the present invention.

Figure 3A:
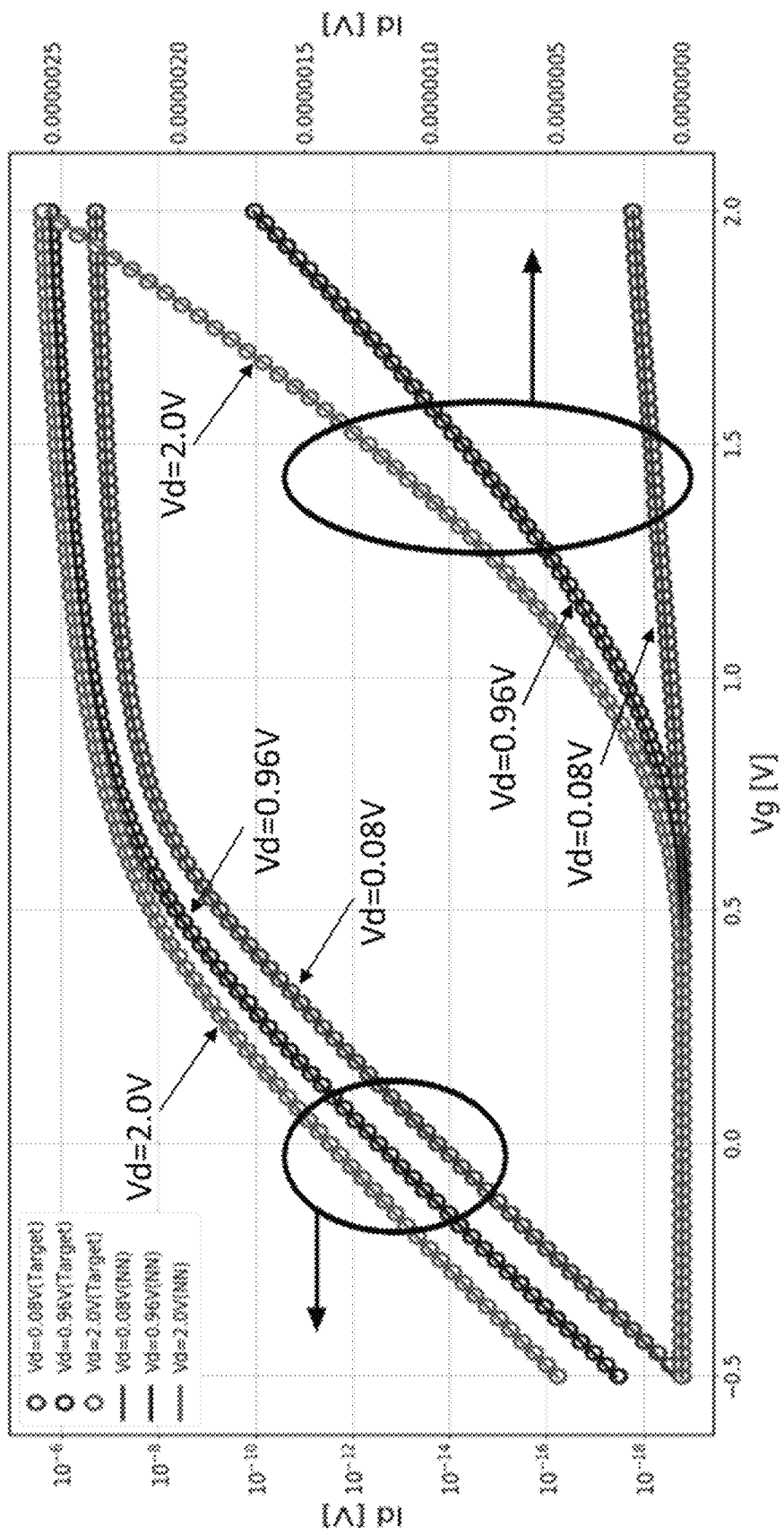
FIG. 3A is a graph depicting drain current-gate voltage (I-V) data from Target data (e.g., the output of a technology computer aided design tool or experimentally measured) at a plurality of different drain voltage biases and corresponding curves computed by a trained neural network according to one embodiment of the present invention.
Figure 3B:
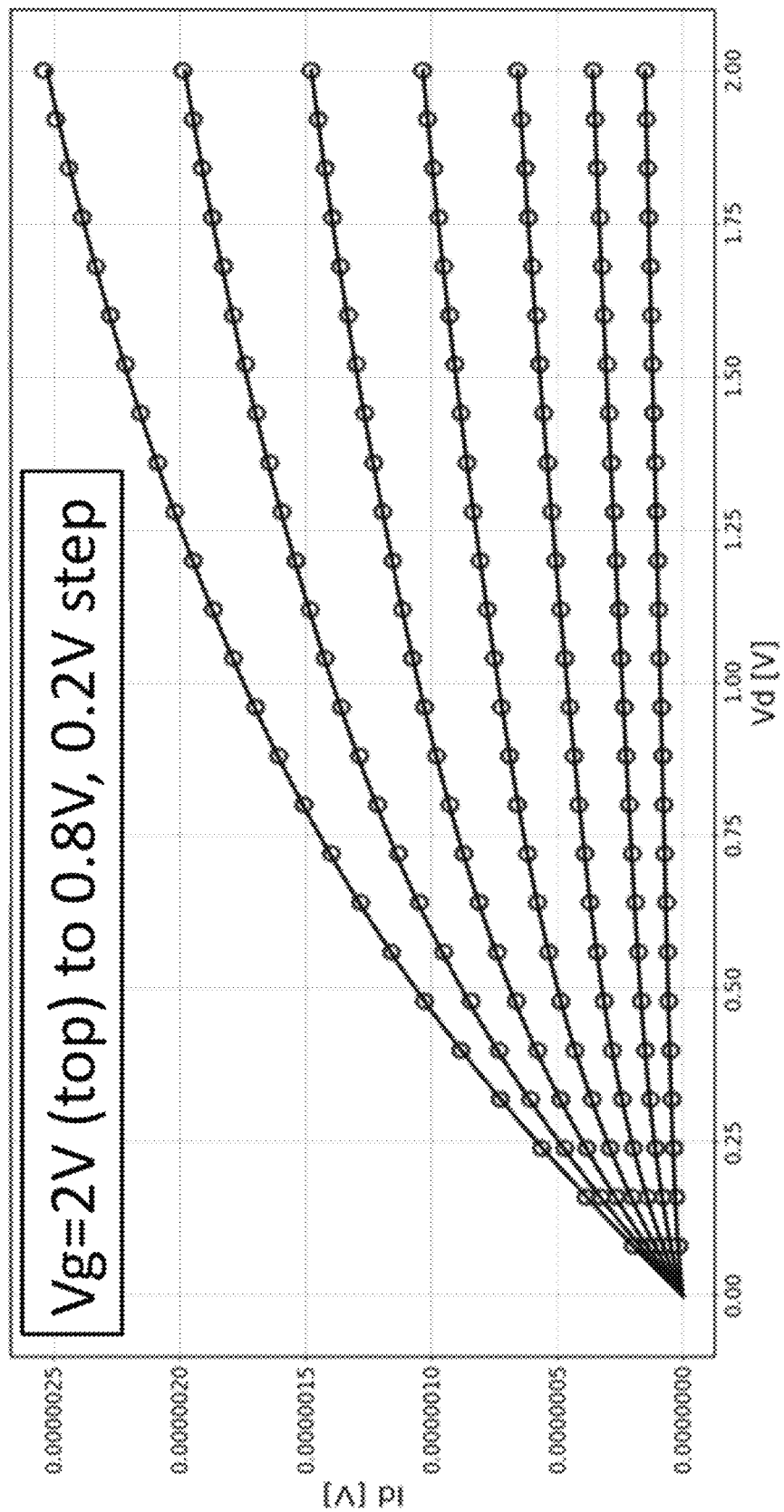
FIG. 3B is a graph depicting drain current versus-drain voltage (I-V) data from Target data at a plurality of different gate voltage biases (from a maximum of 2V to 0.8V with a step size of 0.2V between adjacent curves) and corresponding curves computed by a trained neural network according to one embodiment of the present invention.

FIG. 3A is a graph depicting drain current-gate voltage (I-V) data from Target data (e.g., the output of a transistor computer aided design tool or experimentally measured) at a plurality of different drain voltage biases and corresponding curves computed by a trained neural network according to one embodiment of the present invention. FIG. 3B is a graph depicting drain current versus-drain voltage (I-V) data from Target data at a plurality of different gate voltage biases (from a maximum of 2V to 0.8V with a step size of 0.2V between adjacent curves) and corresponding curves computed by a trained neural network according to one embodiment of the present invention. The target data are shown by circles and the curves computed by the trained neural network are shown as lines of corresponding shade. In FIG. 3A, both the target data and the curves are depicted both on a log scale (in the target data and curves in the upper and left hand side of the graph) and on a linear scale (in the target data and curves on the lower and right hand side of the graph), whereas in FIG. 3B the data are only shown on a linear scale. As seen in FIGS. 3A and 3B, the trained neural network closely and smoothly tracks the target data, with root sum squared (RSS) error of less than 0.2%. This comparison of the output of the neural network to the target data may correspond to the check performed in operation 230, as described above.

The neural network output shown in FIGS. 3A and 3B were generated using a neural network having two hidden layers, 15 neurons in the first hidden layer, 10 neurons in the second hidden layer, and a sigmoid activation function between layers.

Figure 4A:
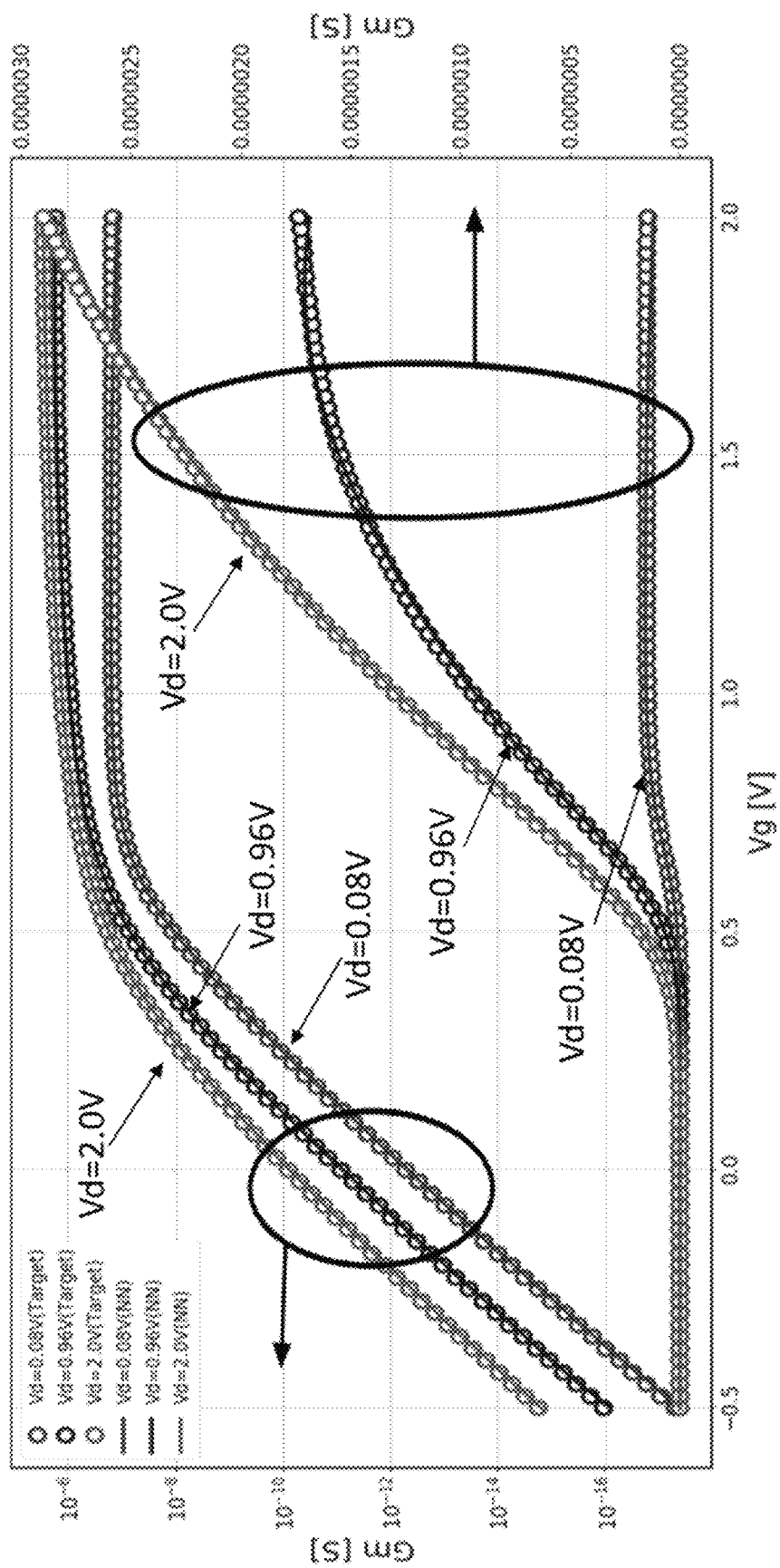
FIG. 4A is a graph depicting the transconductance of a Target transistor with respect to gate voltage and corresponding curves computed by the trained neural network of FIGS. 3A and 3B.
Figure 4B:
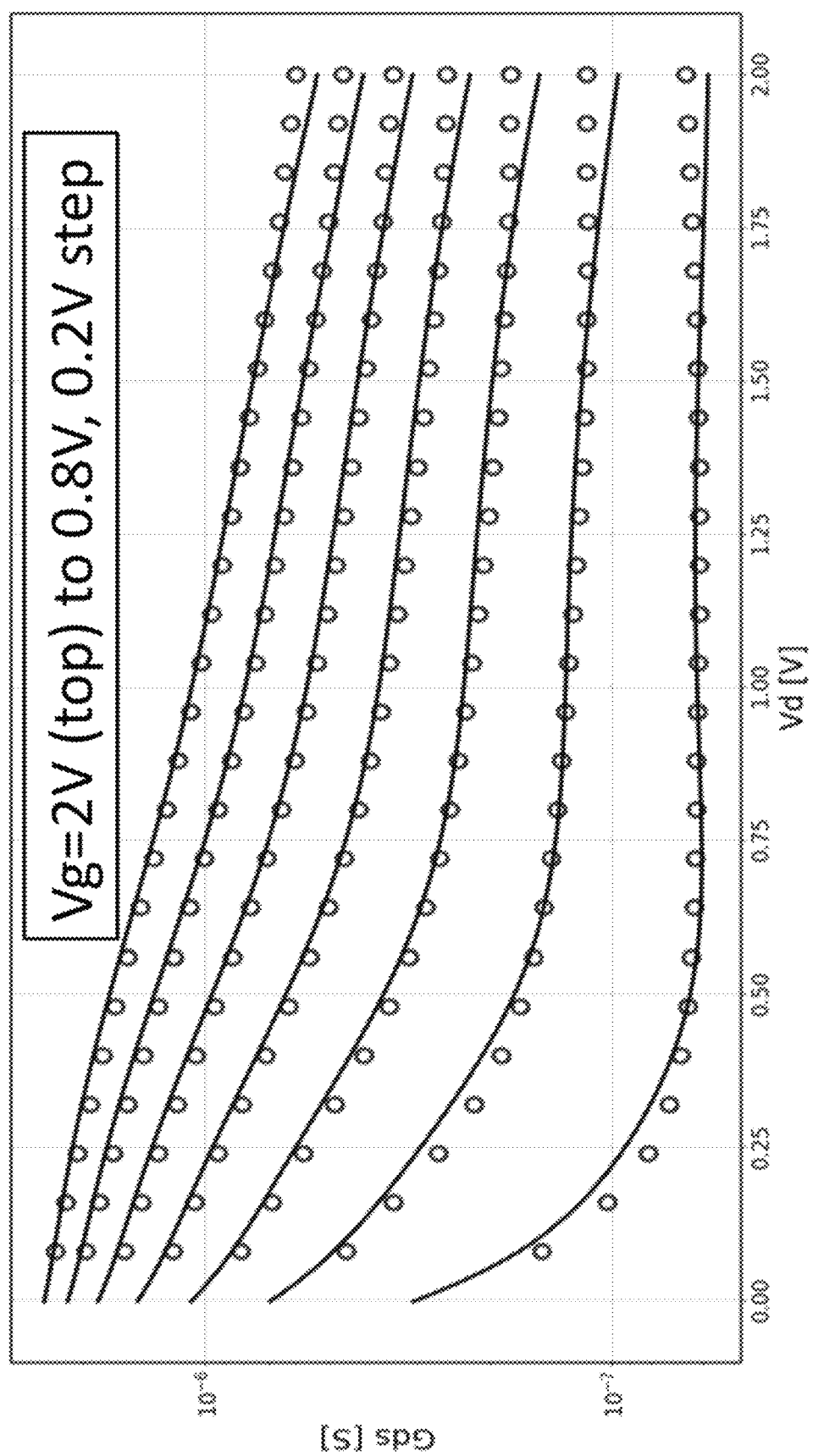
FIG. 4B is a graph showing output conductance of a Target transistor with respect to drain bias voltage and corresponding curves computed by the trained neural network of FIGS. 3A and 3B.

FIG. 4A is a graph depicting the transconductance of a Target transistor with respect to gate voltage and corresponding curves computed by the trained neural network of FIGS. 3A and 3B. FIG. 4B is a graph showing output conductance of a Target transistor with respect to drain bias voltage and corresponding curves computed by the trained neural network of FIGS. 3A and 3B at a plurality of different gate voltage biases (from a maximum of 2V to 0.8V with a step size of 0.2V between adjacent curves). The I-V and C-V derivatives (transconductance Gm and output conductance Gds) of the neural network model are useful for detecting potential issues with the model, such as overfitting. To calculate the Gm or Gds according to some embodiments of the present invention, the Vg or Vd step used is smaller than the step in the target I-V data. As shown in FIGS. 4A and 4B, the derivatives of the curves output by this particular trained neural network are smooth and continuous, and have a good fit with the target data, and therefore this trained neural network would pass the check performed in operation 250, as described above.

Figure 5A:
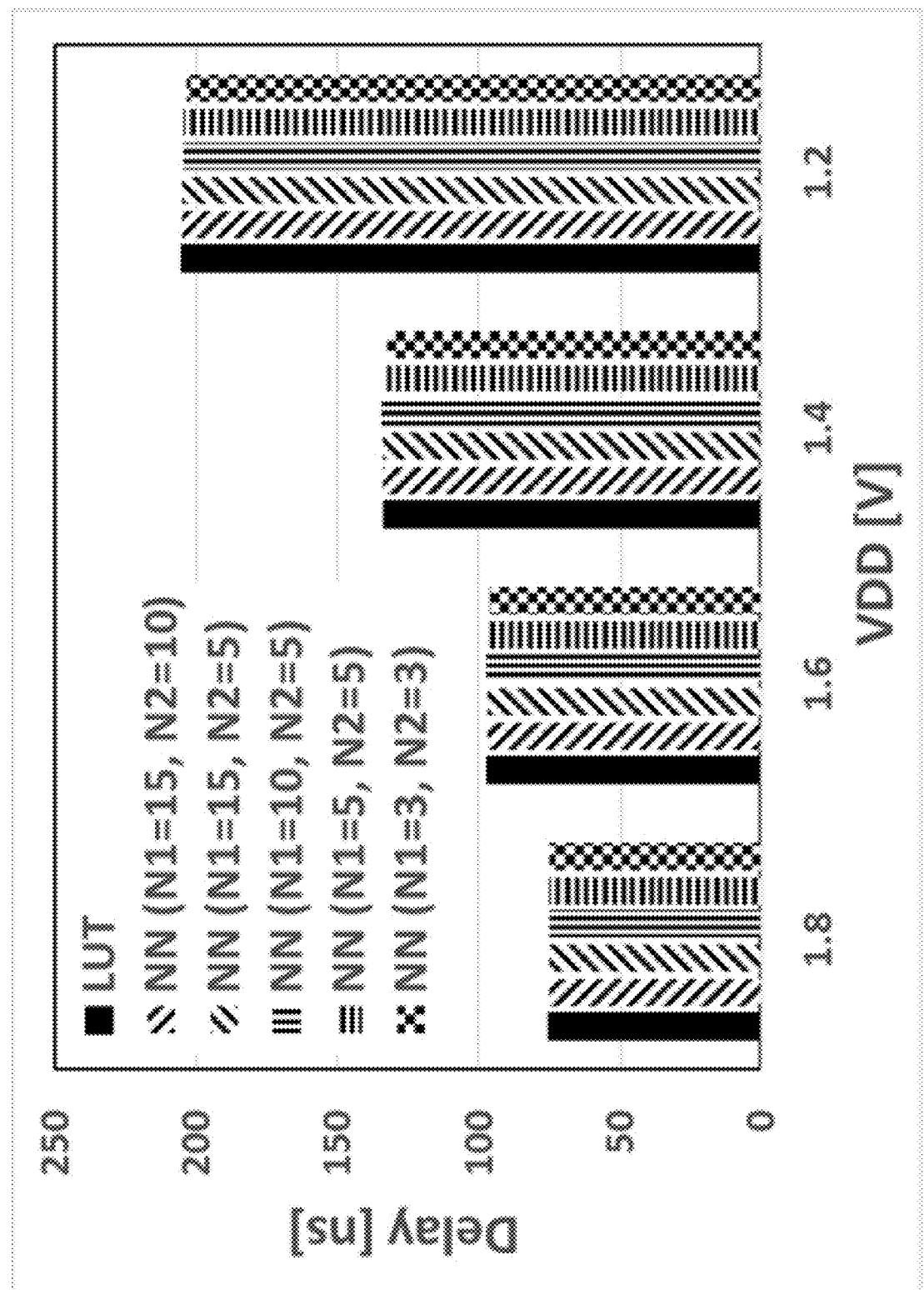
FIGS. 5A, 5B, 5C, and 5D respectively show the values predicted by a LUT model and five neural network models according to embodiments of the present invention with respect to various output parameters for different driving voltages VDD.
Figure 5B:
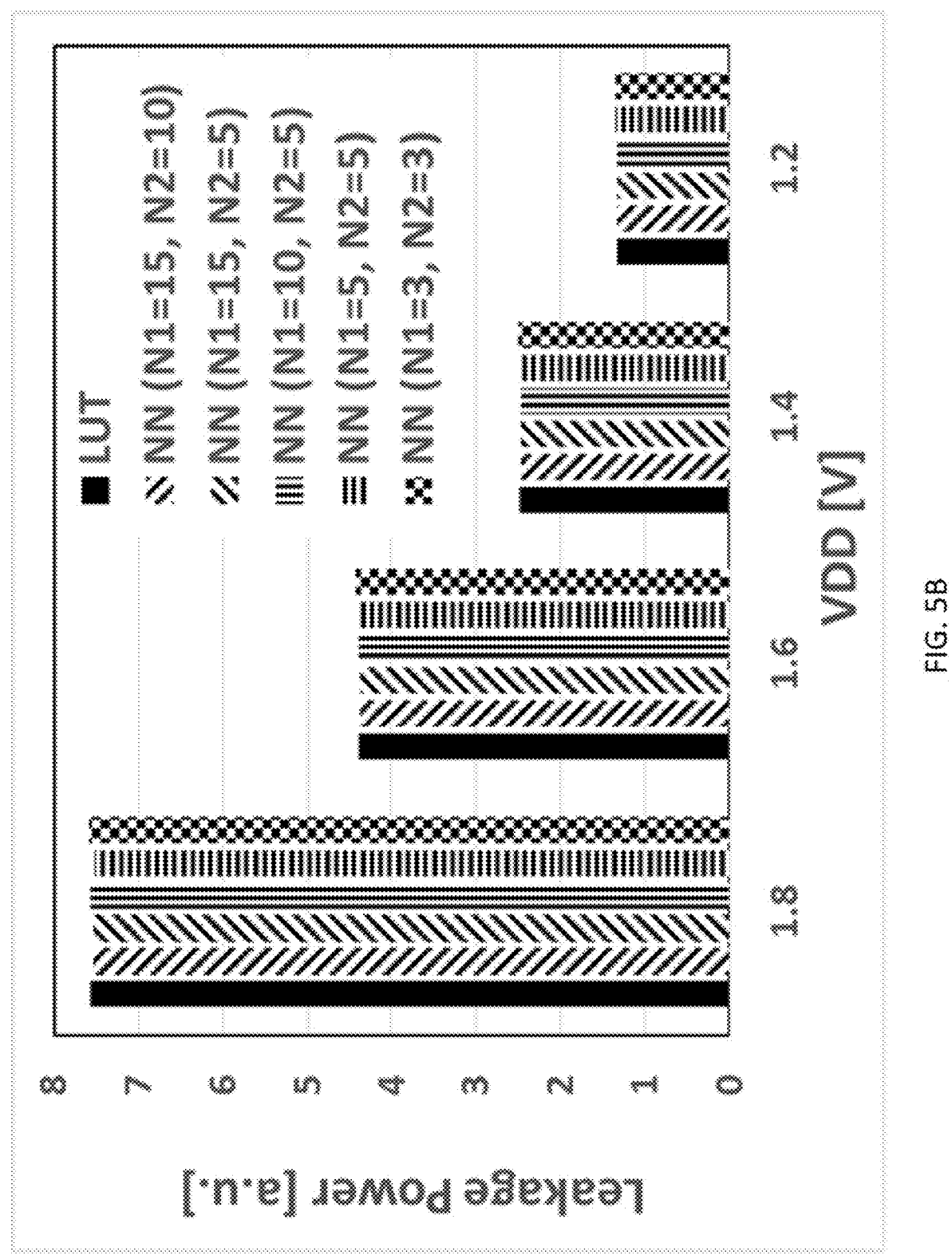
Figure 5C:
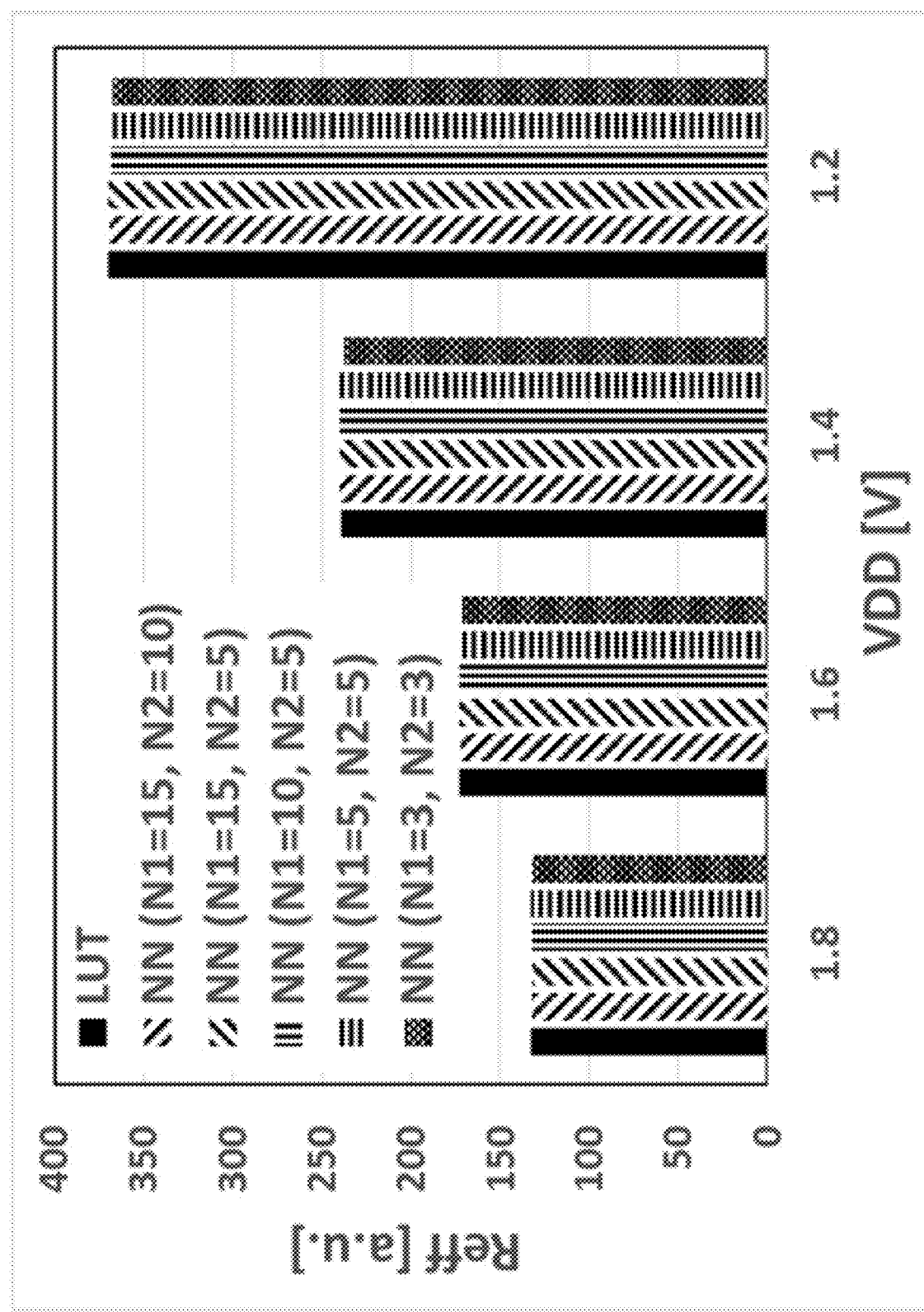
Figure 5D:
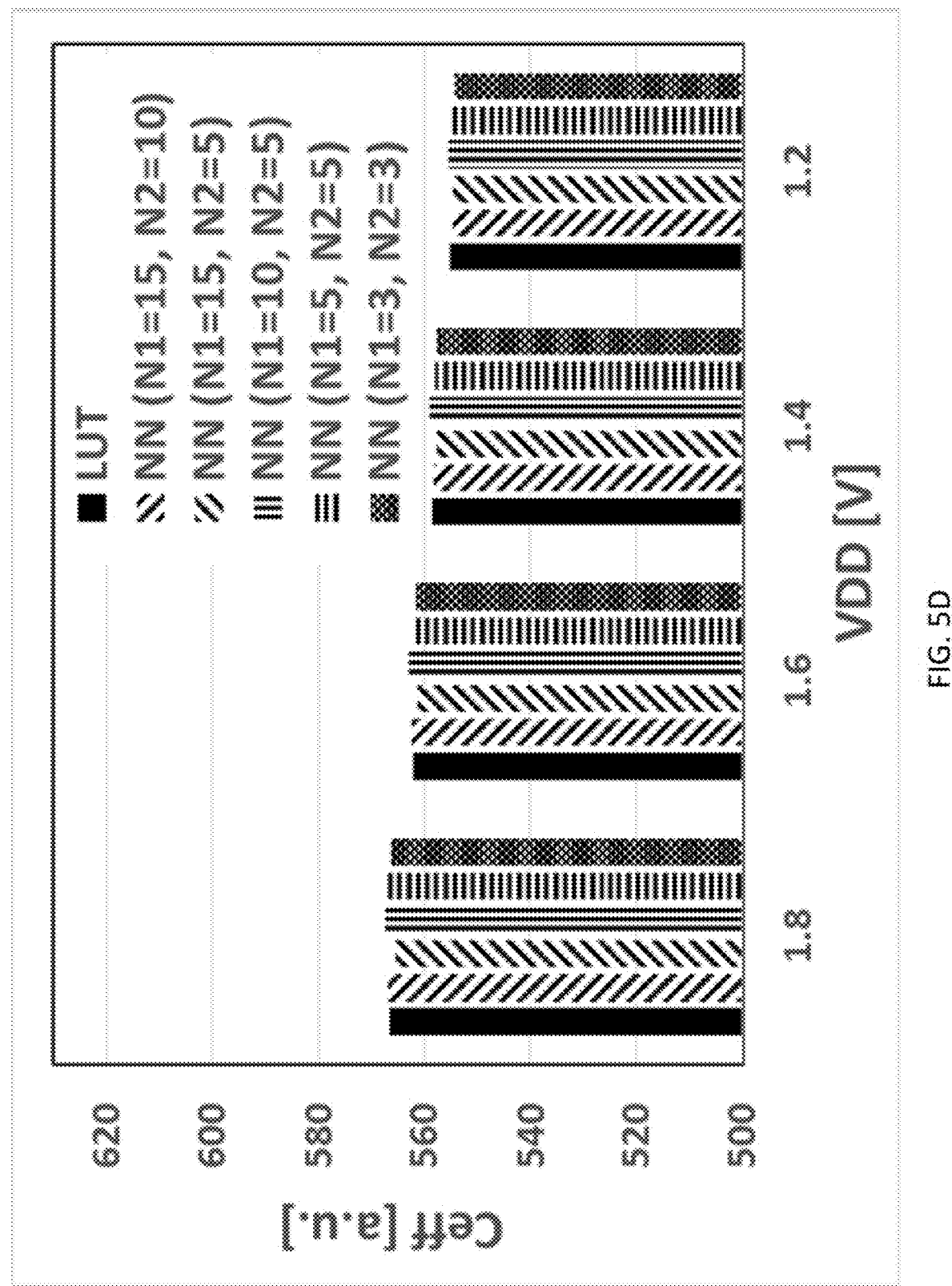

To measure the performance of the neural network based approach to transistor modeling, several different neural networks were trained with different hyper-parameters and compared a baseline implementation using a look-up table (LUT). In particular, five different neural networks were generated, where each of the neural networks had two hidden layers, but different numbers of neurons in the hidden layers, as shown in Table 1, below:

FIGS. 5A, 5B, 5C, and 5D respectively show the values predicted by a LUT model and five neural network models according to embodiments of the present invention with respect to various output parameters for different driving voltages VDD. FIG. 5A depicts the predicted switching delay (in nanoseconds), FIG. 5B depicts the predicted leakage power (in arbitrary units), FIG. 5C depicts the predicted effective resistance Reff (in arbitrary units), and FIG. 5D depicts the predicted effective capacitance Ceff (in arbitrary units). As seen in FIGS. 5A, 5B, 5C, and 5D, the values computed by each of the five models are relatively close, suggesting that each of the models is generally capable of computing reasonably accurate values.

Figure 6:
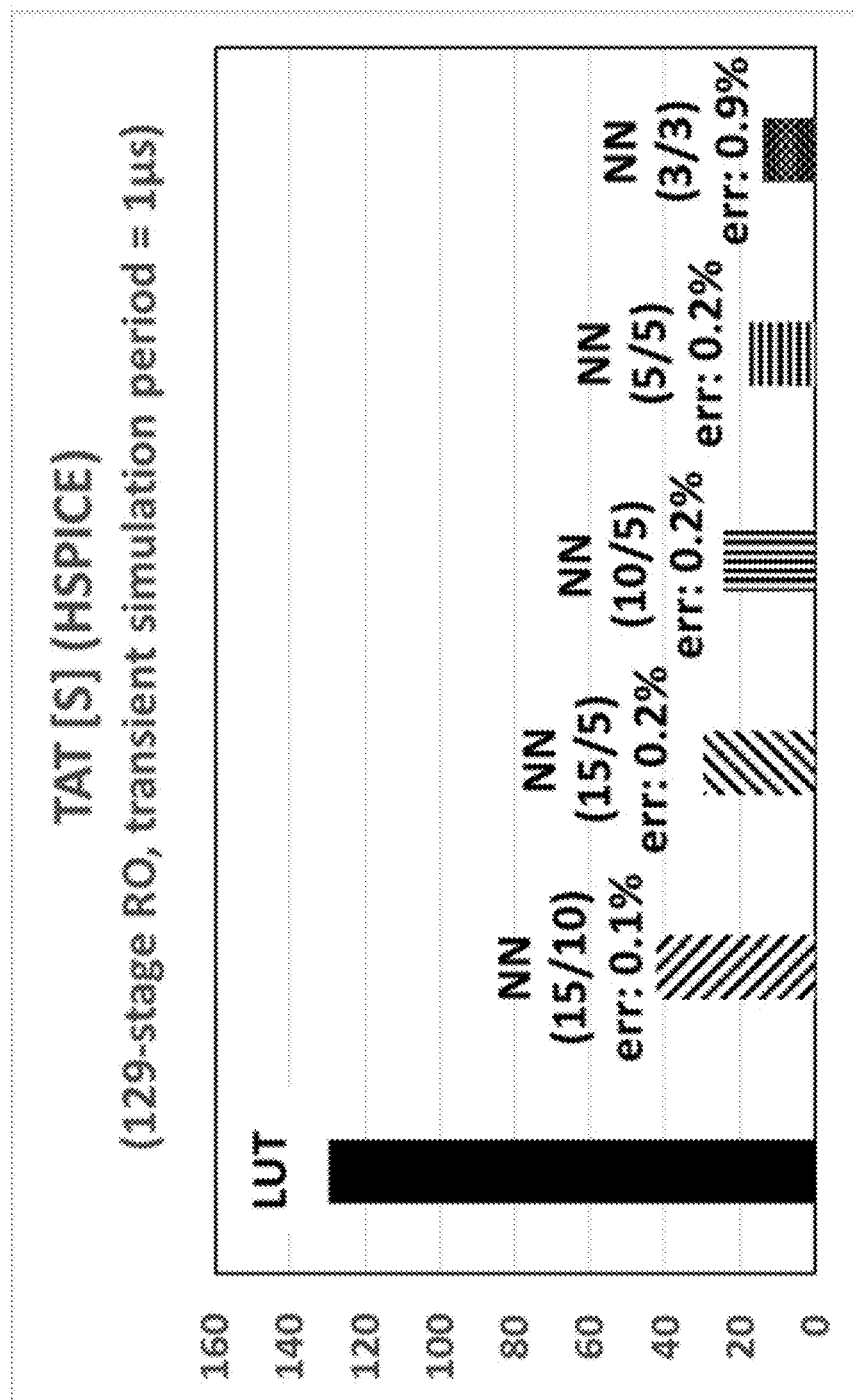
FIG. 6 is a graph depicting the turnaround times measured for running HSPICE simulations of a 129-stage ring oscillator (RO) using the LUT model and each of the neural network models according to embodiments of the present invention.

FIG. 6 is a graph depicting the turnaround times (in seconds) measured for running HSPICE simulations of a 129-stage ring oscillator (RO) using the LUT model and each of the neural network models according to embodiments of the present invention. The turnaround time (TAT) of each simulation run was measured and the error of the results was compared to the baseline LUT model. As shown in FIG. 6, the simulation run using the LUT model had a turnaround time of over 120 seconds, while all of the simulations run using the neural network models had turnaround times less than 45 seconds, where smaller networks were associated with shorter turnaround times and where the smallest network (#5, with 3 neurons in each of the two hidden layers) had a turnaround time under 20 seconds. In addition, FIG. 6 and Table 1 below show that, although the error increased with smaller neural networks, the error level stayed relatively low up until the case of 5 neurons in both the first and second hidden layers.

TABLE 1

| Neural Network | neurons in first hidden layer (N1) | neurons in second hidden layer (N2) | Error compared to LUT in simulation of 129-stage RO |
|---|---|---|---|
| 1 | 15 | 10 | 0.1% |
| 2 | 15 | 5 | 0.2% |
| 3 | 10 | 5 | 0.2% |
| 4 | 5 | 5 | 0.2% |
| 5 | 3 | 3 | 0.9% |

Accordingly, the use of neural networks in transistor models significantly decreases turnaround time (TAT) for running circuit simulations, while maintaining high accuracy versus comparative techniques such as lookup table (LUT) based models.

Model Retargeting

When developing compact model libraries for modeling new technology (e.g., new transistor designs) as described above, a large amount of the data for training the model is provided by I-V and C-V data measured from early hardware or from computer aided design software. However, these training data may not align with the electrical targets (ETs) of the final design of the circuit element. Accordingly, in some embodiments of the present invention, a selected subset of model parameters is tuned so that the output of the trained model matches the electrical targets (ETs). This process of tuning the parameters of a previously trained model to match the electrical targets may be referred to as model re-targeting.

In the case of neural network based models, merely re-training the neural network to fit the ETs likely results in overfitting due to the limited number of ETs (e.g., because the small size of the ET data set). Accordingly, some aspects of embodiments of the present invention relate to techniques for performing re-targeting of the trained neural network based on the ETs without causing overfitting.

One aspect of embodiments of the present invention relates to constraining the hyper-parameters of the neural network trained as described above with respect to FIG. 2 such that the number of neurons in the final hidden layer is less than the number of ETs (e.g., no more than the number of ETs minus one). (Having more fitting parameters than the number of ETs may cause the problem to be under defined.) For example, the initial selection of hyper-parameters in operation 210 may choose a number of neurons for the last hidden layer that is less than the number of ETs, and the adjustment of the hyper-parameters in operation 240 may ensure that the number of neurons in the last hidden layer is not increased beyond one less than the number of ETs.

According to another aspect of embodiments of the present invention, the ret-targeting of the neural network model 100 that was trained based on the I-V and C-V data (e.g., from the TCAD model and/or experimental measurements), is performed by adjusting only the learned parameters W and b related to the output layer of the neural network to match the ETs (e.g., from the last hidden layer to the output layer 150, such as the weights W3 and biases b3 from Hidden Layer 2 134 to output layer 150 of the neural network 100 of FIG. 1). These parameters mapping values from the last hidden layer to the output layer may also be referred to as $W_{output}$ output and $b_{output}$.

In some embodiments of the present invention, the electronic targets include multiple device instances (e.g., different gate lengths L). Accordingly, separate $W_{output}$ and $b_{output}$ values can be computed for re-targeting the same neural network for each device instance to best fit the ETs of each device instance. In such embodiments, the neural network model includes an analytical or table-based model for applying the appropriate $W_{output}$ and $b_{output}$ parameters as a function of the device instance.

Figure 7A:
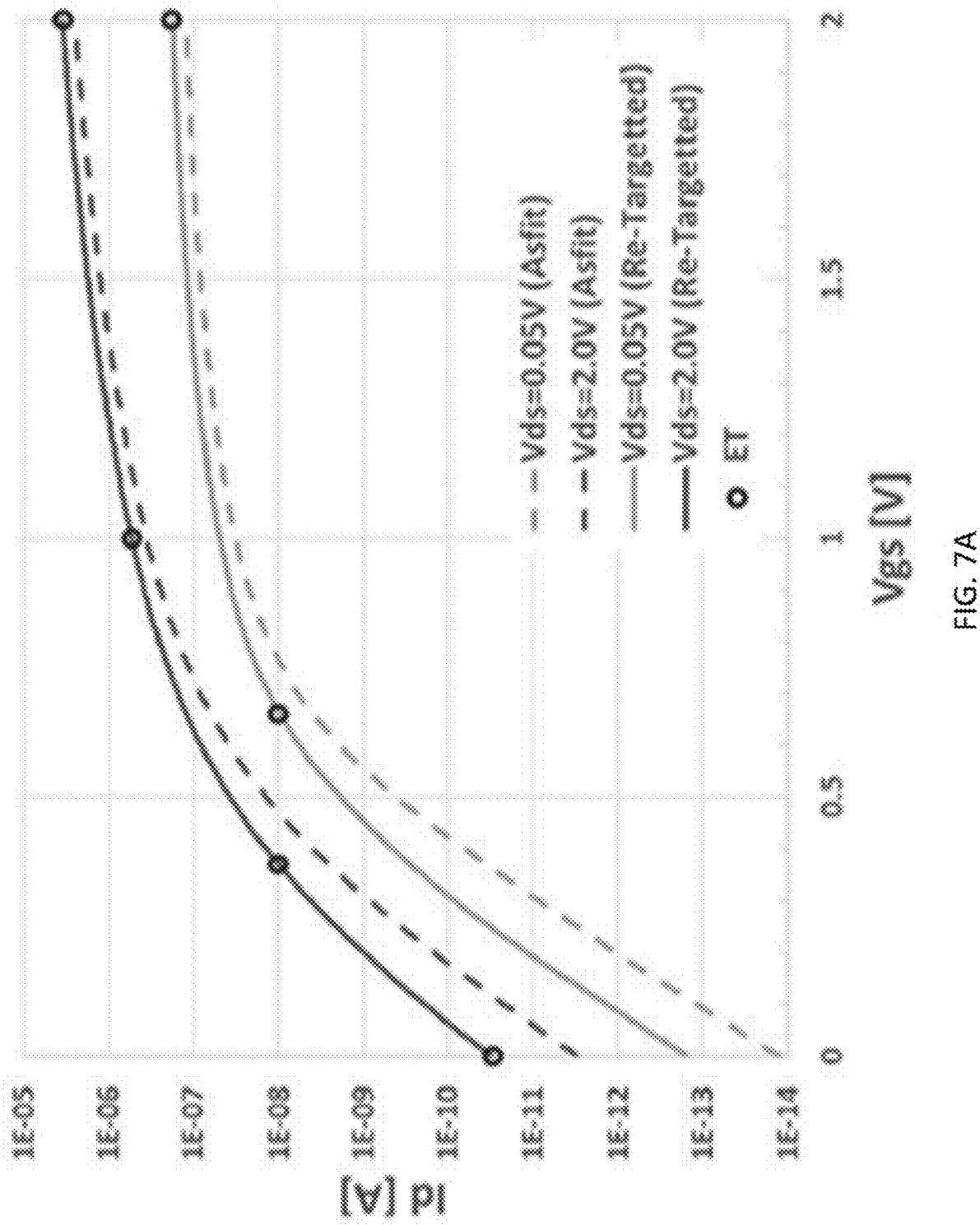
FIG. 7A is a graph on a log scale depicting data points corresponding to electrical targets and the outputs of a neural network model before and after re-targeting according to one embodiment of the present invention.
Figure 7B:
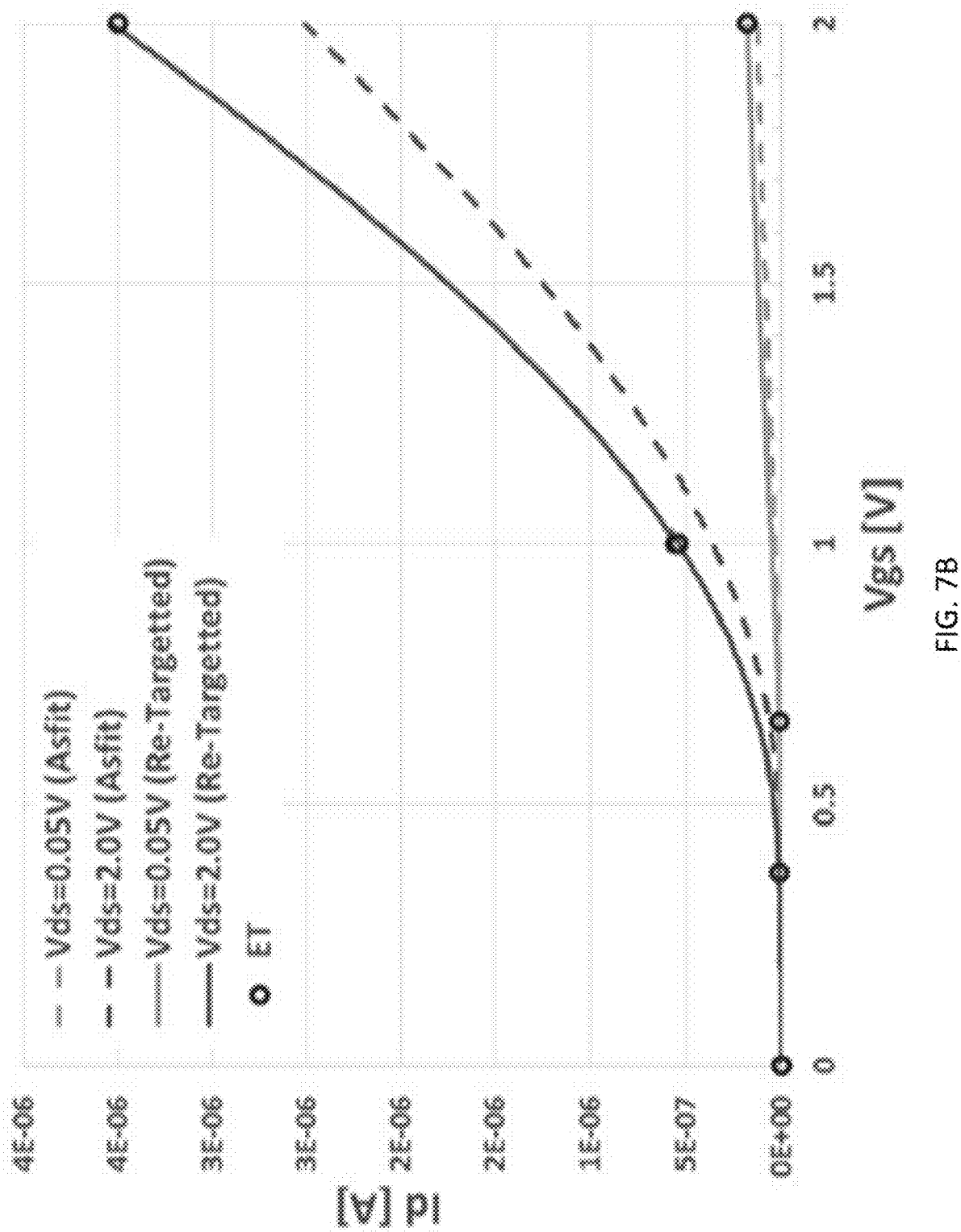
FIG. 7B is a graph on a linear scale depicting data points corresponding to electrical targets and the outputs of a neural network model before and after re-targeting according to one embodiment of the present invention.

FIG. 7A is a graph on a log scale depicting data points corresponding to electrical targets and the outputs of a neural network model before and after re-targeting according to one embodiment of the present invention. FIG. 7B is a graph on a linear scale depicting data points corresponding to electrical targets and the outputs of a neural network model before and after re-targeting according to one embodiment of the present invention. The dashed lines show the I-V curves computed by the neural networks as fit to the initial training data. The circles represent the electronic targets of the final design of the transistor. The solid lines represent the output of the re-targeted neural network after adjustment of the $W_{output}$ and $b_{output}$ parameters to fit the ETs. The particular neural network used to generate the curves shown in FIGS. 7A and 7B was trained to model a 3-terminal field effect transistor (FET), which was initially trained based on TCAD data. The neural network included two hidden layers, where the first hidden layer had a size of 15 neurons and the second hidden layer had a size of 5 neurons, and the total number of parameters was 131. As shown in FIGS. 7A and 7B, the curves from the re-targeted model show reasonable shapes and does not appear to overfit the data.

Table 2, below, summarizes various metrics of the modeled transistor, the electronic targets for each of those metrics, the value predicted by the "As fit" model (and deviation from the electronic target—in percentage for Ioff, Ilow, Ion and Idlin, and in millivolts for Vtsat and Vtlin), and the value predicted by the "Re-targeted" model (and deviation from the electronic target—in percentage for Ioff, Ilow, Ion and Idlin, and in millivolts for Vtsat and Vtlin)

TABLE 2

| Metrics | ET | As fit | Re-targeted |
| --- | --- | --- | --- |
| Ioff [pA] | 30 | 3.05 (−90%) | 30.3 (1%) |
| Ilow [µA] | 0.54 | 0.359 (−34%) | 0.536 (−0.7%) |
| Ion [µA] | 3.5 | 2.51 (−28%) | 3.52 (0.7%) |
| Idlin [µA] | 0.18 | 0.121 (−33%) | 0.175 (−2.8%) |
| Vtsat [V] | 0.37 | 0.471 (101 mV) | 0.371 (1 mV) |
| Vtlin [V] | 0.66 | 0.763 (103 mV) | 0.664 (4 mV) |

Accordingly, re-targeting according to some embodiments of the present invention can improve the fit between the model trained based on initial TCAD and experimental data and the electronic targets of the final design.

Process Variation Capture

Some aspects of embodiments of the present invention relate to capturing process variations (e.g., naturally occurring variations in the attributes of transistors when integrated circuits are fabricated).

Figure 8:
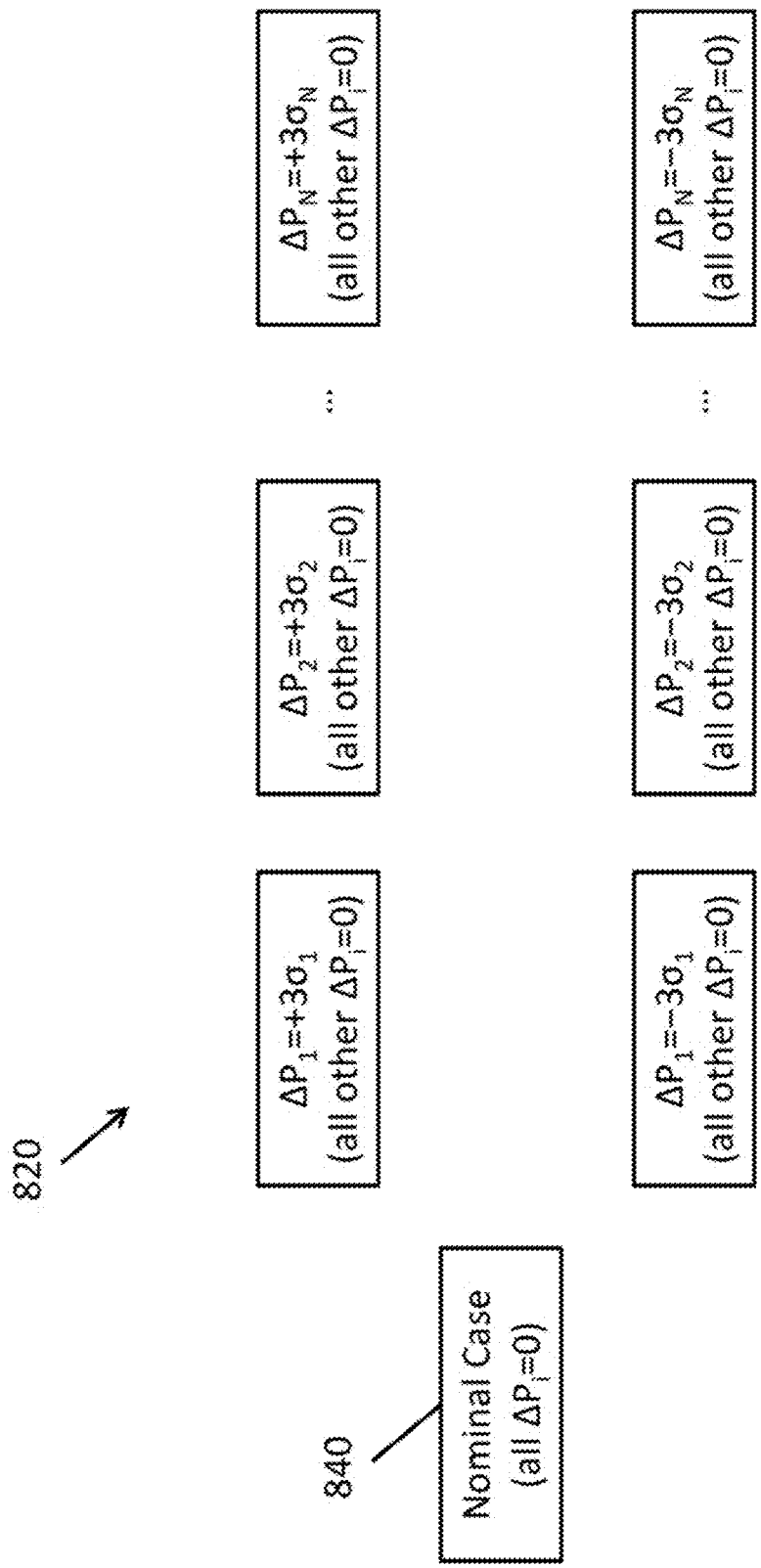
FIG. 8 is a schematic diagram of a set of simulation data generated to account for process variations according to one embodiment of the present invention.

According to one aspect of embodiments of the present invention, to evaluate the impacts of process variations on transistor characteristics, the first step is to obtain a well-calibrated transistor level model for the nominal device (e.g., a TCAD simulation deck), where the well-calibrated transistor level model can be controlled to account for one or more process variation (PV) sources. FIG. 8 is a schematic diagram of a set of simulation data generated to account for process variations according to one embodiment of the present invention. As shown in FIG. 8, a set of N dominating PV sources is identified (e.g., $P_1, P_2, \ldots, P_N$). Current-Voltage (I-V) and Charge-Voltage (Q-V) data may then be automatically generated by running simulations of the transistor level model (e.g., a TCAD simulation), where each simulation has exactly one of the N different PV sources set to an extreme value (e.g., $\Delta P_i = +3\sigma_i$ or $\Delta P = -3\sigma_i$) and all other PV sources set to 0 (e.g., $\Delta P_j = 0$ for $j \neq i$). These cases where one of the PV sources is set to an extreme value will be referred to herein as PV corners 820. In addition, a simulation is run where all PV sources are set to a nominal condition ($\Delta P_i = 0$ for all i) 840. This results in a total of 2·N+1 cases. The simulated I-V and Q-V data for each of the 2·N+1 can then be applied to capture process variations in neural network based compact models, as described in more detail below.

According to one embodiment of the present invention, referred to herein as "Method 1," for each PV corner (e.g., for a given one of the 2·N cases, a separate neural network model is trained, for example, based on operation 220 of FIG. 2, above. In some embodiments of the present invention, the nominal case where all $\Delta P_i = 0$ is used to determine hyper-parameters in accordance with FIG. 2 for the neural network, and the same hyper-parameters are used for training each of the 2·N cases where one of the PV sources is varied.

When simulating a FET instance with PVs, the value of each PV source in the simulated FET instance is taken as a model instance parameter. The current and charge at each PV corner are calculated using the corresponding neural network model. Then the final values of current and charge for this FET instance are computed using the method described in, for example, U.S. Pat. No. 10,204,188, issued on Feb. 12, 2019 and in Wang, Jing, et al. "A generic approach for capturing process variations in lookup-table-based FET models." 2015 International Conference on Simulation of Semiconductor Processes and Devices (SISPAD). IEEE, 2015, the entire disclosures of which are incorporated by reference herein.

To briefly summarize, in some embodiments, a linear dependence and an exponential dependence of each PV source is computed. The linear dependence may be represented by:

$$I_d(lin) = I_{d0} \cdot \left(1 + \sum_{i=1}^{N} \frac{I_{di} - I_{d0}}{I_{d0}} \cdot \frac{|\Delta P_i|}{3}\right)$$

and the exponential dependence may be represented by:

$$I_d(\exp) = I_{d0} \cdot \prod_{i=1}^{N} \left(\frac{I_{di}}{I_{d0}}\right)^{\frac{|\Delta P_i|}{3}}$$

where $I_{d0}$ is the nominal current value, $\Delta P_i$ is the PV for source i (in number of σ) for each model corner instance, and $$I_{di} = \begin{cases} I_d | P_i @ +3\sigma & \text{when } \Delta P_i \geq 0 \\ I_d | P_i @ -3\sigma & \text{when } \Delta P_i < 0 \end{cases}$$

In the general case, for a given bias point (Vgs0, Vds0), the $I_d$ dependence on Vt variation is measured by extracting:

$$I_d(p) = I_d(Vgs = Vgs0 - \Delta Vt, Vds = Vds0)$$

and $$I_d(m) = I_d(Vgs = Vgs0 + \Delta Vt, Vds = Vds0)$$

from lookup tables. In addition average values can be calculated:

$$I_d(ave1) = [I_d(p) + I_d(m)]/2$$

$$I_d(ave2) = \sqrt{I_d(p) \cdot I_d(m)}$$

and accordingly:

$$\eta = \frac{I_{d0} - I_d(ave2)}{I_d(ave1) - I_d(ave2)}$$

where η=0 for exponential dependence (e.g., sub-Vt $I_d$) and where η=1 for linear dependence (e.g., cap, super-Vt $I_d$ (short-channel).

As such, the resulting current $I_d$ may be computed as a linear combination:

$$I_d = \eta \cdot I_d(lin) + (1-\eta) \cdot I_d(\exp)$$

or $$I_d = \beta \cdot \eta \cdot I_d(lin) + (1 - \beta \cdot \eta) \cdot I_d(\exp)$$

where β is a parameter that can be set for tuning the smoothness of the I-V and Q-V curves (e.g., β=0.6).

Figure 9:
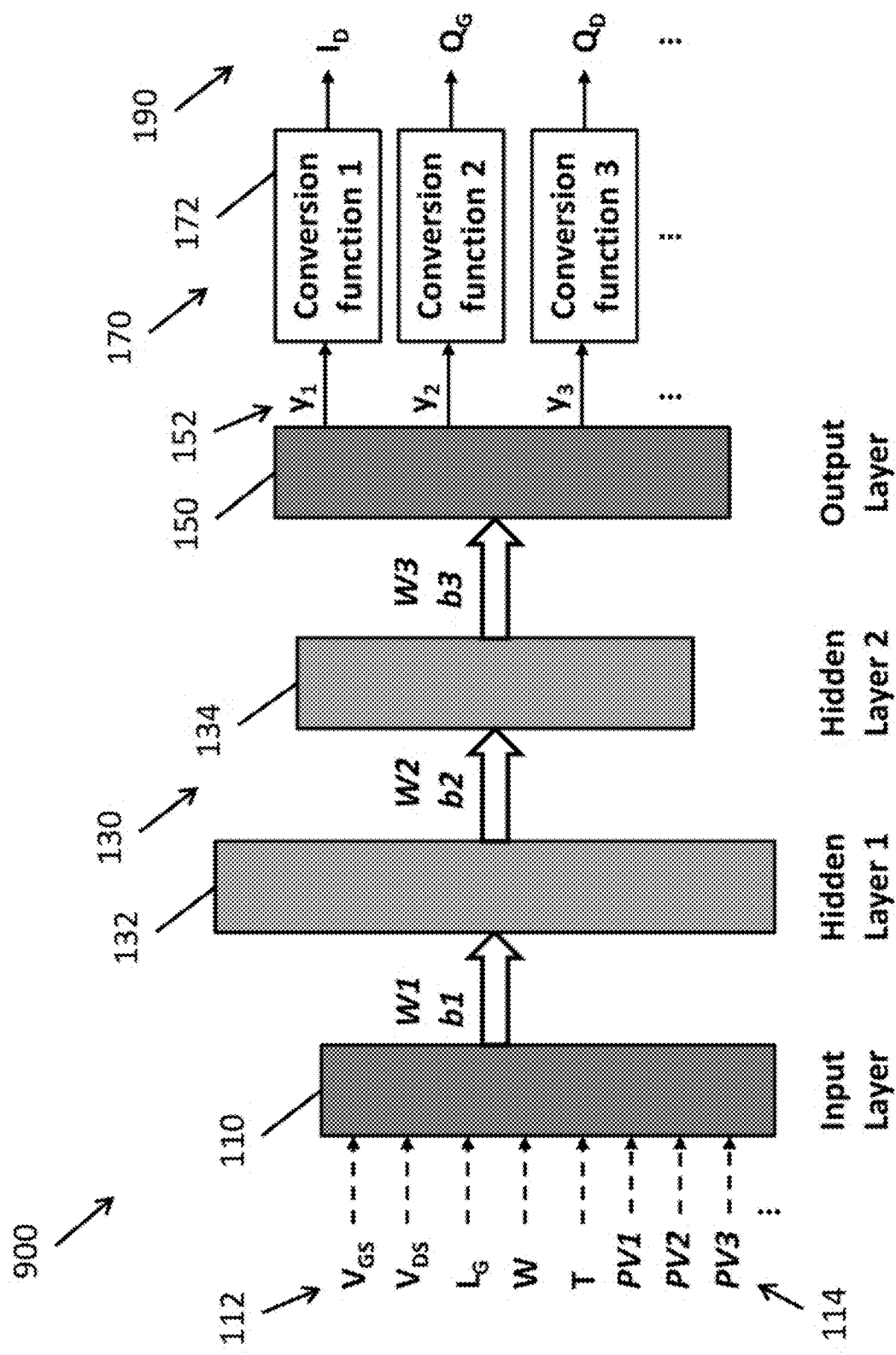
FIG. 9 is as schematic block diagram of a neural network according to one embodiment of the present invention to model the behavior of a transistor and further arranged to receive process variations as inputs to the input layer.

According to another embodiment of the present invention, referred to herein as "Method 2," each process variation (PV) source is added as a neuron to the input layer of the neural network. FIG. 9 is as schematic block diagram of a neural network according to one embodiment of the present invention to model the behavior of a transistor and further arranged to receive process variations as inputs to the input layer. The neural network model 900 may be trained in a manner similar to that described above with respect to operation 220 of FIG. 2, with the addition of one or more process variation inputs (PV1, PV2, PV3, . . . ) to the input layer 110. For any given set of process variation inputs, the corresponding I-V and Q-V curves generated by the transistor level simulation are used as the corresponding output data (e.g., $I_D$, $Q_G$, and $Q_D$ as shown in FIG. 9) to train a single model on all of the PV corners 820 and the nominal case 840. Accordingly, when running simulations with the modified neural network model 900, the value of each PV is taken as a model instance parameter, and the output of the neural network model is for the current and charge of the transistor with the corresponding PVs.

Figure 10:
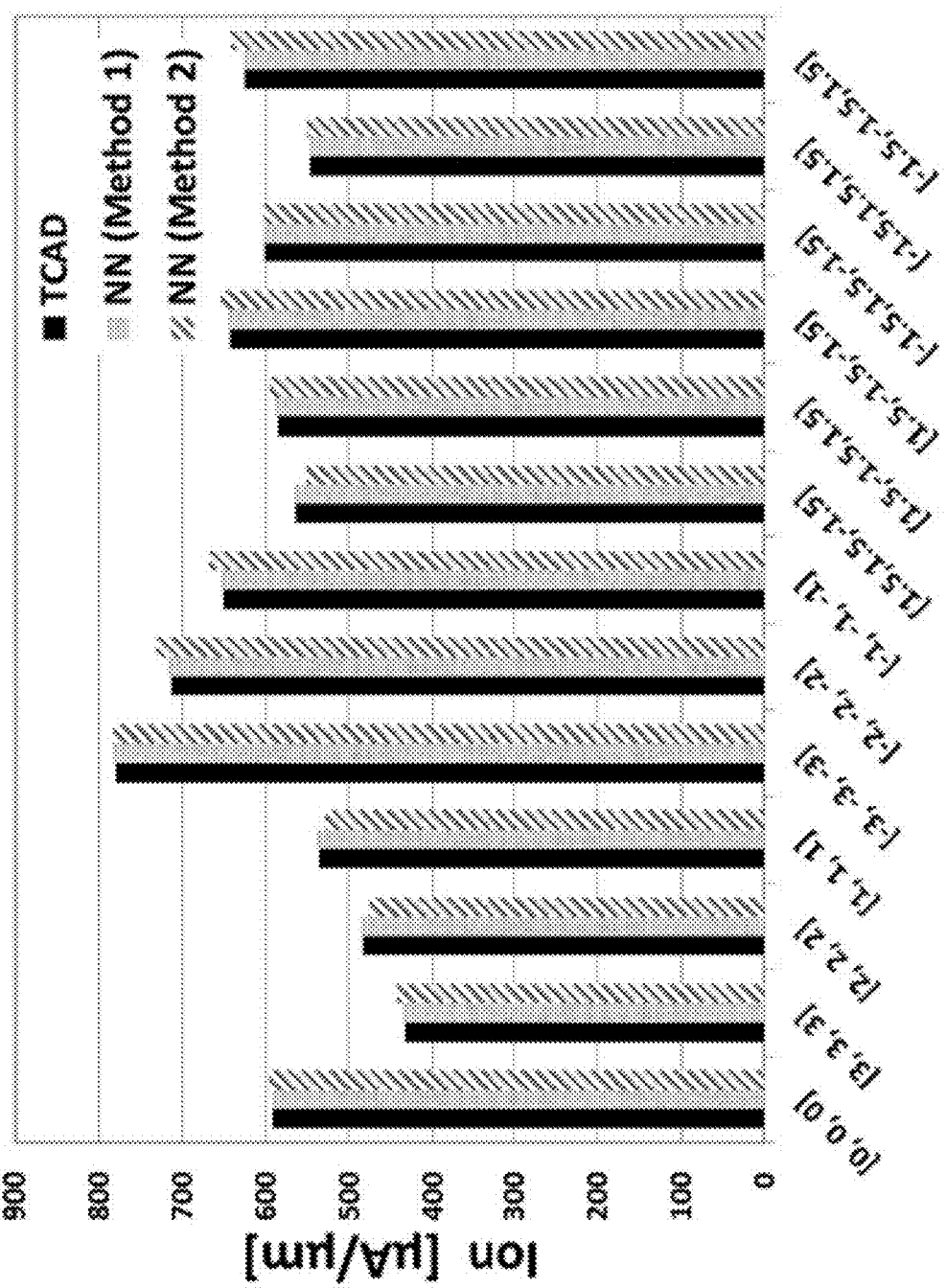
FIG. 10 is a graph showing Ion values in $\mu A/\mu m$ for a transistor having a gate length of 40 nm as predicted by TCAD simulation and by neural networks trained based on two techniques for modeling process variations according to embodiments of the present invention.

FIG. 10 is a graph showing Ion values in µA/µm for a transistor having a length of 40 nm as predicted by TCAD simulations and by neural networks trained based on two techniques for modeling process variations according to embodiments of the present invention. As shown in FIG. 10, both Method 1 and Method 2 closely match the predictions of the TCAD data at the various process variation conditions (combinations of variance of Tox in the range of 1.6±0.1 nm, Lg in the range of 40±3 nm, and Nch in the range of 5.6×10$^{18}$±10%) indicated along the horizontal axis. As such, the techniques for capturing process variations according to embodiments of the present invention provide an accurate and compact representation of the effect of process variations on transistor behavior.

Accordingly, aspects of embodiments of the present invention provide systems and methods for compact modeling of transistor behavior, thereby reducing turnaround time (TAT) for performing simulations of circuits while maintaining high accuracy in the predicted behavior of the modeled transistors.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for generating a model of a transistor, the method comprising:

initializing, by a computing system, a plurality of hyper-parameters configuring a structure of a neural network;

training, by the computing system, the neural network in accordance with the hyper-parameters and a plurality of training data relating transistor input state values to transistor output state values to compute a plurality of neural network parameters;

determining, by the computing system, whether the transistor output state values of the training data match an output of the neural network;

in response to determining that the transistor output state values do not match the output of the neural network, updating, by the computing system, the hyper-parameters and re-training the neural network based on the updated hyper-parameters;

in response to determining that the transistor output state values of the training data match the output of the neural network, porting, by the computing system, the neural network to a circuit simulation code to generate a ported neural network;

simulating a test circuit using the ported neural network to simulate behavior of a transistor of the test circuit to generate simulation output;

determining, by the computing system, whether a turn-around time of the generation of the simulation output is satisfactory;

in response to determining that the turnaround time is unsatisfactory, updating, by the computing system, the hyper-parameters and re-training the neural network based on the updated hyper-parameters; and in response to determining that the turnaround time is satisfactory, outputting the ported neural network as the model of the transistor.

2. The method of claim 1, further comprising simulating a second circuit including the transistor, the simulating the circuit comprising simulating the output of the transistor using the ported neural network.

3. The method of claim 1, wherein the neural network comprises:

an input layer configured to receive the transistor input state values;

a plurality of hidden layers comprising:
a first hidden layer configured to receive activations from the input layer; and
a last hidden layer;

an output layer configured to compute output features from a plurality of activations received from the last hidden layer; and a plurality of conversion functions configured to convert the output features to the output of the neural network, and wherein the neural network parameters comprise weights and biases mapping between adjacent layers of the neural network in accordance with an affine transformation.

4. The method of claim 3, wherein the hyper-parameters comprise:

a number of hidden layers;

for each of the hidden layers, a number of neurons in the hidden layer; and an activation function.

5. The method of claim 4, wherein the determining whether the transistor output state values of the training data match the output of the neural network comprises:

determining whether the output of the neural network is within a first threshold of corresponding values of the transistor output state values; and determining whether a first derivative of the output of the neural network is within a second threshold of corresponding values of a first derivative of the transistor output state values.

6. The method of claim 5 wherein, in response to determining that the output of the neural network is not within the first threshold of corresponding values of the transistor output state values, the hyper-parameters are updated to increase the number of hidden layers or to increase the number of neurons.

7. The method of claim 5 wherein, in response to determining that the first derivative of the output of the neural network is not within the second threshold of corresponding values of the first derivative of the transistor output state values, the hyper-parameters are updated to decrease the number of hidden layers or to decrease the number of neurons.

8. The method of claim 5 wherein, in response to determining that the turnaround time is unsatisfactory, the hyper-parameters are updated to decrease the number of hidden layers or to decrease the number of neurons.

9. The method of claim 3, further comprising re-targeting the neural network in accordance with a plurality of electronic targets, the re-targeting comprising:
updating a plurality of output weights and output biases of the neural network parameters mapping from the last hidden layer to the output layer to fit the output of the neural network to the plurality of electronic targets,
wherein the last hidden layer has fewer neurons than the number of the electronic targets.

10. The method of claim 1, wherein the model captures process variations, and
wherein the training data comprises data relating the transistor input state values to the transistor output state values in accordance with a plurality of process variation corners corresponding to a plurality of process variation sources.

11. The method of claim 10, wherein the method further comprises:
training a plurality of process variation neural networks, each of the process variation neural networks being trained based on training data of a corresponding process variation corner,
wherein the ported neural network comprises the plurality of process variation neural networks.

12. The method of claim 10, wherein the transistor input state values further comprise the plurality of process variation sources, and
wherein the training the neural network comprises training based on the training data relating the transistor input state values to the transistor output state values in accordance with the plurality of process variation corners.

13. A system for generating a model of a transistor, the system comprising:
a processor; and
memory storing instructions that, when executed by the processor, cause the processor to:
initialize a plurality of hyper-parameters configuring a structure of a neural network;
train the neural network in accordance with the hyper-parameters and a plurality of training data relating transistor input state values to transistor output state values to compute a plurality of neural network parameters;
determine whether the transistor output state values of the training data match an output of the neural network;
in response to determining that the transistor output state values do not match the output of the neural network, update the hyper-parameters and re-train the neural network based on the updated hyper-parameters;
in response to determining that the transistor output state values of the training data match the output of the neural network, port the neural network to a circuit simulation code to generate a ported neural network;
simulate a test circuit using the ported neural network to simulate behavior of a transistor of the test circuit to generate simulation output;
determine whether a turnaround time of the generation of the simulation output is satisfactory;
in response to determining that the turnaround time is unsatisfactory, update the hyper-parameters and re-train the neural network based on the updated hyper-parameters; and
in response to determining that the turnaround time is satisfactory, output the ported neural network as the model of the transistor.

14. The system of claim 13, wherein the memory further stores instructions that, when executed by the processor, cause the processor to simulate a second circuit including the transistor by simulating the output of the transistor using the ported neural network.

15. The system of claim 13, wherein the neural network comprises:
an input layer configured to receive the transistor input state values;
a plurality of hidden layers comprising:
a first hidden layer configured to receive activations from the input layer; and
a last hidden layer;
an output layer configured to compute output features from a plurality of activations received from the last hidden layer; and
a plurality of conversion functions configured to convert the output features to the output of the neural network, and
wherein the neural network parameters comprise weights and biases mapping between adjacent layers of the neural network in accordance with an affine transformation.

16. The system of claim 15, wherein the hyper-parameters comprise:
a number of hidden layers;
for each of the hidden layers, a number of neurons in the hidden layer; and
an activation function.

17. The system of claim 16, wherein the instructions to determine whether the transistor output state values of the training data match the output of the neural network comprise instructions for:
determining whether the output of the neural network is within a first threshold of corresponding values of the transistor output state values; and determining whether a first derivative of the output of the neural network is within a second threshold of corresponding values of a first derivative of the transistor output state values.

18. The system of claim 17 wherein the memory further stores instructions that, when executed by the processor, cause the processor to, in response to determining that the output of the neural network is not within the first threshold of corresponding values of the transistor output state values, update the hyper-parameters to increase the number of hidden layers or to increase the number of neurons.

19. The system of claim 17 wherein the memory further stores instructions that, when executed by the processor, cause the processor to, in response to determining that the first derivative of the output of the neural network is not within the second threshold of corresponding values of the first derivative of the transistor output state values, update the hyper-parameters to decrease the number of hidden layers or to decrease the number of neurons.

20. The system of claim 17 wherein the memory further stores instructions that, when executed by the processor, cause the processor to, in response to determining that the turnaround time is unsatisfactory, update the hyper-parameters to decrease the number of hidden layers or to decrease the number of neurons.

21. The system of claim 15, wherein the memory further stores instructions that, when executed by the processor, cause the processor to re-target the neural network in accordance with a plurality of electronic targets, the re-targeting comprising:
    updating a plurality of output weights and output biases of the neural network parameters mapping from the last hidden layer to the output layer to fit the output of the neural network to the plurality of electronic targets,
    wherein the last hidden layer has fewer neurons than the number of the electronic targets.

22. The system of claim 13, wherein the model captures process variations, and
    wherein the training data comprises data relating the transistor input state values to the transistor output state values in accordance with a plurality of process variation corners corresponding to a plurality of process variation sources.

23. The system of claim 22, wherein the memory further stores instructions that, when executed by the processor, cause the processor to:
    train a plurality of process variation neural networks, each of the process variation neural networks being trained based on training data of a corresponding process variation corner,
    wherein the ported neural network comprises the plurality of process variation neural networks.

24. The system of claim 22, wherein the transistor input state values further comprise the plurality of process variation sources, and
    wherein the memory further stores instructions that, when executed by the processor, cause the processor to train the neural network based on the training data relating the transistor input state values to the transistor output state values in accordance with the plurality of process variation corners.

* * * * *